Feb. 6, 1951 G. ROSENQVIST 2,540,175

MANUFACTURE BY ELECTRODEPOSITION

Filed Feb. 11, 1947 14 Sheets-Sheet 1

Inventor
Gunnar Rosenqvist
By. Richard ... attys

Feb. 6, 1951 G. ROSENQVIST 2,540,175

MANUFACTURE BY ELECTRODEPOSITION

Filed Feb. 11, 1947 14 Sheets-Sheet 2

Inventor
Gunnar Rosenqvist

By Richard [signature] attys

Feb. 6, 1951 G. ROSENQVIST 2,540,175

MANUFACTURE BY ELECTRODEPOSITION

Filed Feb. 11, 1947 14 Sheets-Sheet 3

Inventor
Gunnar Rosenqvist
By: Richard Whiting Atty.

Feb. 6, 1951 G. ROSENQVIST 2,540,175

MANUFACTURE BY ELECTRODEPOSITION

Filed Feb. 11, 1947 14 Sheets-Sheet 4

Inventor
Gunnar Rosenqvist

By Richard Stichting Attys

MANUFACTURE BY ELECTRODEPOSITION

Inventor
Gunnar Rosenqvist
By Richard Whiting Att'ys

Feb. 6, 1951 G. ROSENQVIST 2,540,175

MANUFACTURE BY ELECTRODEPOSITION

Filed Feb. 11, 1947 14 Sheets-Sheet 6

Inventor
Gunnar Rosenqvist
By. Richard [illegible]
Atty.

Feb. 6, 1951 G. ROSENQVIST 2,540,175

MANUFACTURE BY ELECTRODEPOSITION

Filed Feb. 11, 1947 14 Sheets-Sheet 7

Inventor
Gunnar Rosenquist
Richard Whiting
Atty.

Feb. 6, 1951 G. ROSENQVIST 2,540,175

MANUFACTURE BY ELECTRODEPOSITION

Filed Feb. 11, 1947 14 Sheets-Sheet 8

Inventor
Gunnar Rosenqvist by Richard Whiting Atty

Feb. 6, 1951 G. ROSENQVIST 2,540,175

MANUFACTURE BY ELECTRODEPOSITION

Filed Feb. 11, 1947 14 Sheets-Sheet 9

Inventor
Gunnar Rosenqvist
By Richard [illegible] Atty

Inventor
Gunnar Rosenqvist

By Richard [signature] Atty.

MANUFACTURE BY ELECTRODEPOSITION

INVENTOR.
Gunnar Rosenqvist
By: Richard [signature] atty

MANUFACTURE BY ELECTRODEPOSITION
Filed Feb. 11, 1947 14 Sheets-Sheet 12
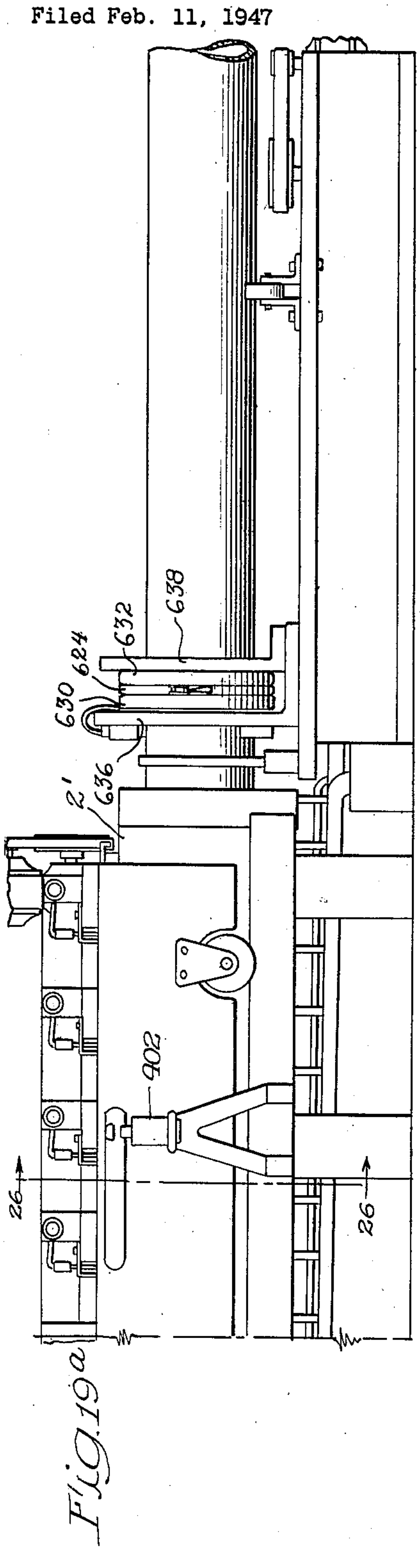
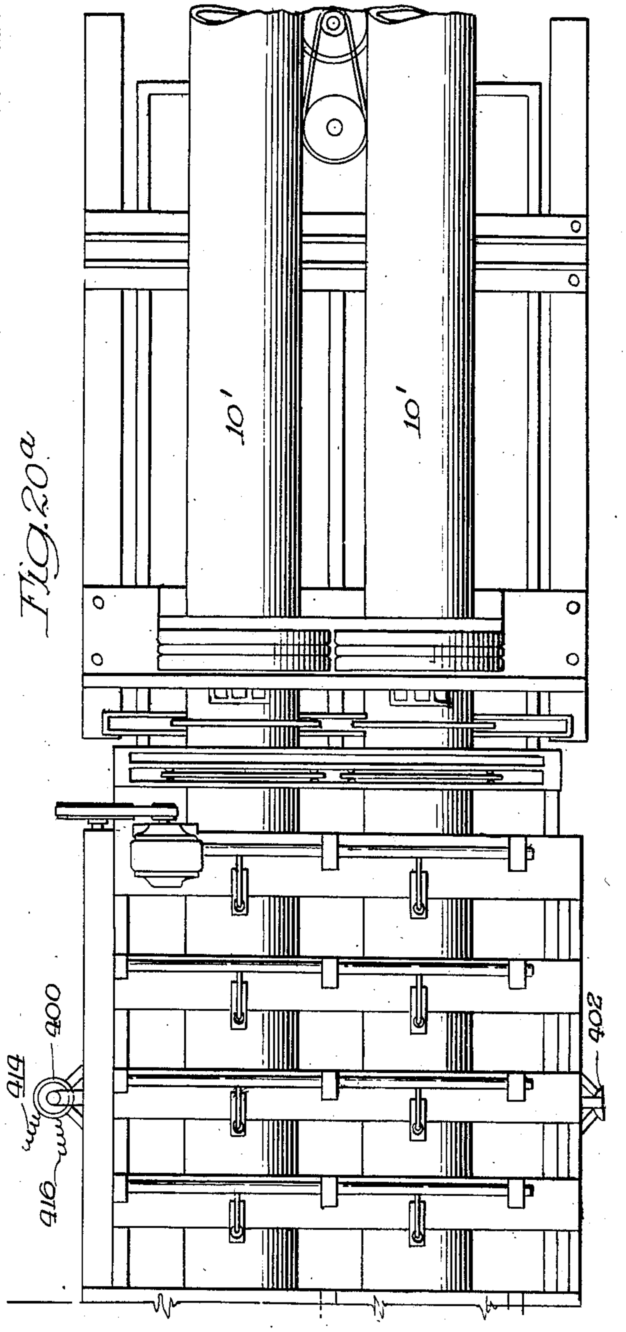
Fig. 19a
Fig. 20a
INVENTOR.
Gunnar Rosenqvist
By [illegible] Atty

MANUFACTURE BY ELECTRODEPOSITION

Filed Feb. 11, 1947 14 Sheets-Sheet 13

Inventor
Gunnar Rosenqvist
By. Richard Whiting Atty

MANUFACTURE BY ELECTRODEPOSITION

Filed Feb. 11, 1947 14 Sheets-Sheet 14

INVENTOR.
Gunnar Rosenqvist
By Richard Whiting Atty

Patented Feb. 6, 1951

2,540,175

UNITED STATES PATENT OFFICE 2,540,175

MANUFACTURE BY ELECTRODEPOSITION

Gunnar Rosenqvist, Calumet, Mich.

Application February 11, 1947, Serial No. 727,793

30 Claims. (Cl. 204—9)

This invention relates to the manufacture of metal articles by electrolytic deposition and is a continuation in part of my applications Ser. No. 460,220, filed September 30, 1942, and Ser. No. 443,288, filed May 16, 1942, now abandoned.

A primary object of my invention is to provide for the utilization selectively of either or both of two methods of mechanically displacing or working metal particles as they are deposited electrolytically, to afford two kinds of internal structure in the electrodeposited metal. These two methods differ fundamentally from each other.

One method consists of moving surface particles of the cathode, or electrodeposited metal, in directions laterally of the cathode surface to positions loosely superimposed on the outside of the surrounding cathode surface, and is effected by abrading, grinding, or otherwise frictionally working the deposited metal. The particles as thus displaced have little or no bond with the cathode surface and, when covered over by further electrodeposition, form laminations within the structure enclosing plating solution which expands on subsequent heating to form pockets within the metal structure.

The other method consists of moving metal particles from one position to another entirely within the cathode surface, and is effected by pressing on the surface particles of the cathode only in directions normal to the surface of working contact thereby avoiding frictional abrasion. In accordance with this method, there being no loosely superimposed particles on top of the cathode surface, that surface will be built up by further electrodeposition into a sound structure that has no laminations or pockets.

These methods are performed mechanically by the use of a tool and thus I have found that the use of a tool permits a choice of working actions and that by changing the participation of friction forces during working contact different internal structures in the electrodeposited metal may be obtained for different desired purposes.

In commercial adaptations of my methods the tool has a working face which is small in comparison with the area of the cathode surface and in order that all areas of the surface may be worked by the use of such a tool, it is necessary that the tool traverse the surface, as well as press against it. Despite such traverse motion I assure selectivity of the working actions above referred to. Thus, to avoid any frictional sliding between the tool and the cathode surface during working contact one embodiment of my invention employs a cathode surface which moves intermittently and is held motionless during contact of the tool with the surface of the deposited metal and another embodiment employs a cathode surface which, although moving continuously, is virtually motionless during such contact because the tool breaks contact with the metal surface immediately upon striking it so that there is no opportunity for lateral relative movement during contact. Where, on the contrary, I desire frictional sliding between the tool and the cathode surface in selected areas I provide a further embodiment in which such sliding occurs but in which it is controlled for the purposes intended.

My further objects are to improve generally on known methods of manufacture by electrodeposition and on the construction of machines of this character as well as to provide metal articles of novel characteristics as will appear.

By my invention I believe I have achieved for the first time electrolytically refined copper cathodes of commercially satisfactory internal structure in shapes that can be used directly for further fabrication of sheets, tubes, etc., thus eliminating the standard practice of melting, casting, scalping, piercing or extruding, and several initial drawing operations, when making redraw stock for seamless copper tubing; and the quality of my electrolytic cathodes is not only satisfactory but far superior to anything yet put on the market due to its freedom from oxide and its perfectly sound internal structure.

In the drawings—

Fig. 1 is a side elevation view of the inlet end of a machine embodying my invention, shown as manufacturing tubing continuously.

Fig. 1*a* is a side elevation view of the delivery end of the machine, Fig. 1 and 1*a* together showing the complete machine.

Figs. 2 and 2*a* are plan views corresponding to Figs. 1 and 1*a*.

Figs. 3 and 3*a* show one of the mandrels and the tubing thereon in process of manufacture.

Fig. 4 is a vertical section along the lines 4—4 of Fig. 5.

Fig. 4*a* is a vertical section through one of the clutches.

Figures 11A, 11B, 11C, 11X, 11Y, 11Z:
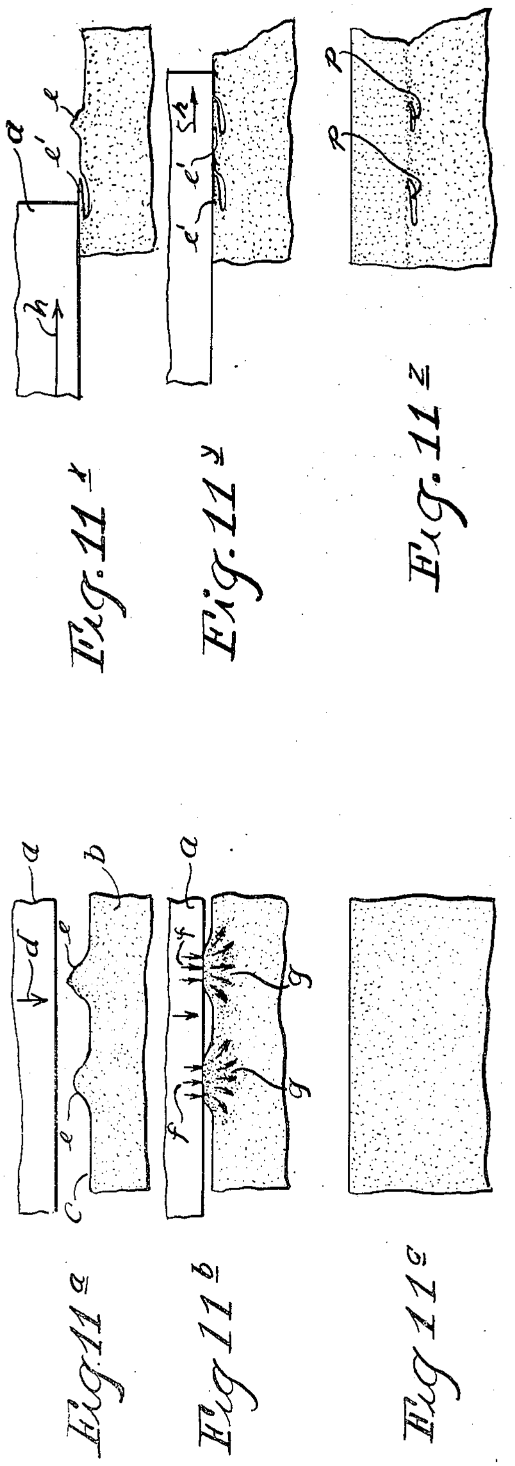

Figs. 11*a*, 11*b* and 11*c* illustrate diagrammatically the method of working, without frictional abrasion, and Figs. 11*x*, 11*y* and 12*z* show the other method, employing frictional abrasion.

Figs. 12, 12*a*, 12*b*, and 12*c* show progressive positions of a mandrel and tubing being formed thereon.

Figures 13, 15:
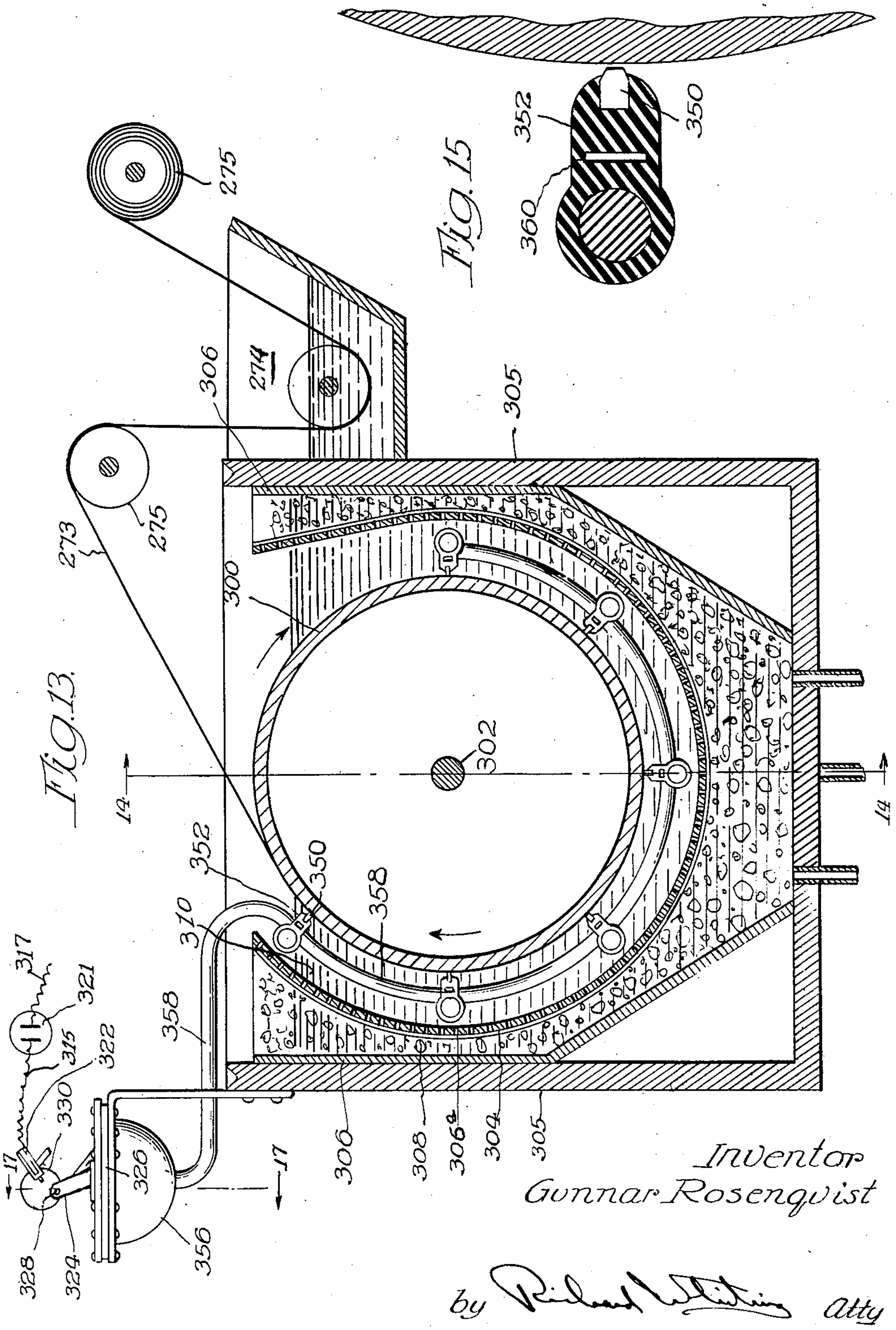

Fig. 13 is a vertical section of a modification of the machine.

Figures 14, 15A, 16:
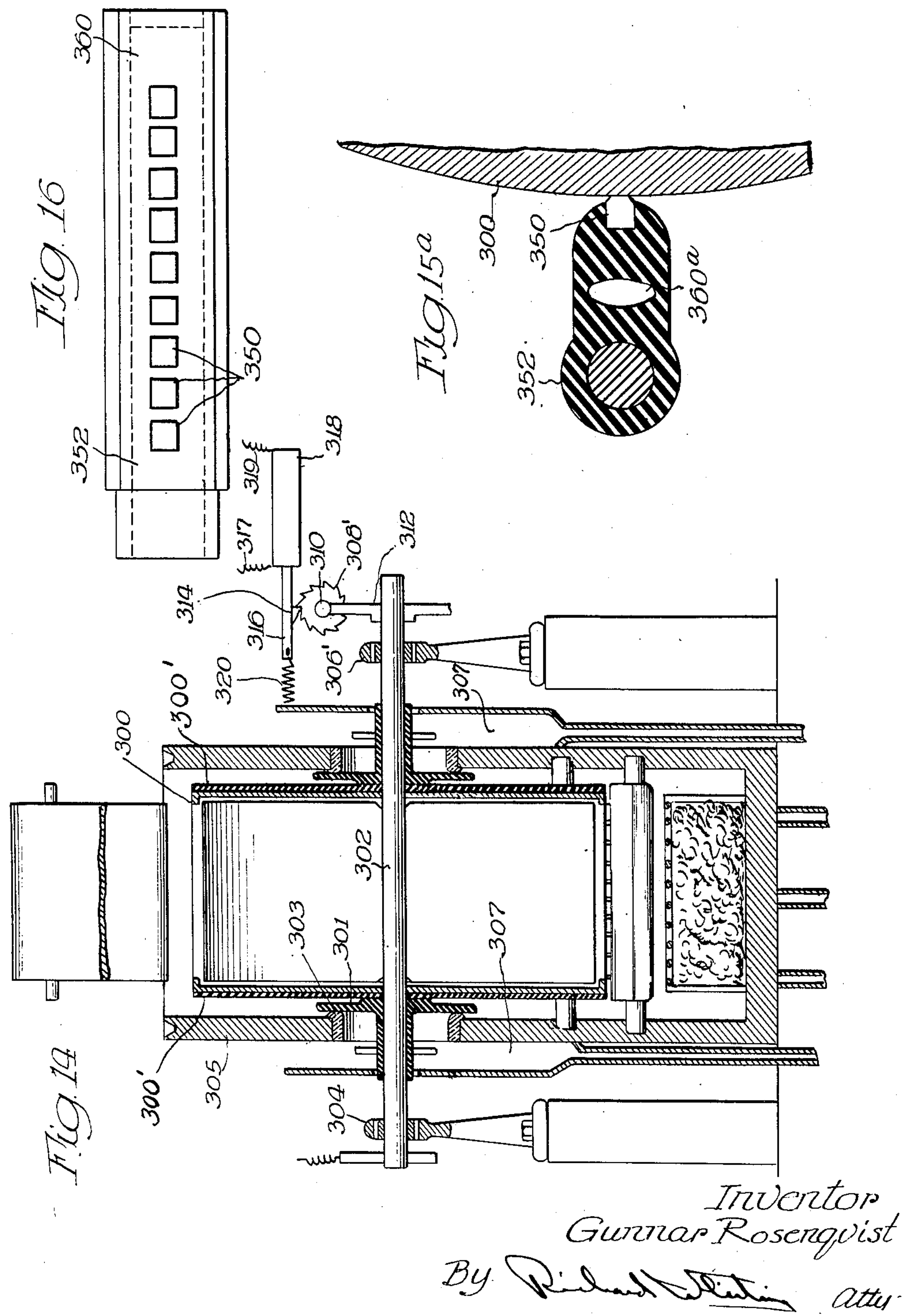

Fig. 14 is a vertical section taken along the line 14—14 of Fig. 13.

Fig. 15 is an enlarged vertical section of a pressure applying element or hammer.

Fig. 15*a* is a view similar to Fig. 15 showing the pressure element in pressing position against the surface of the metal sheet.

Fig. 16 is a face view of the pressure elements.

Figures 17, 18:
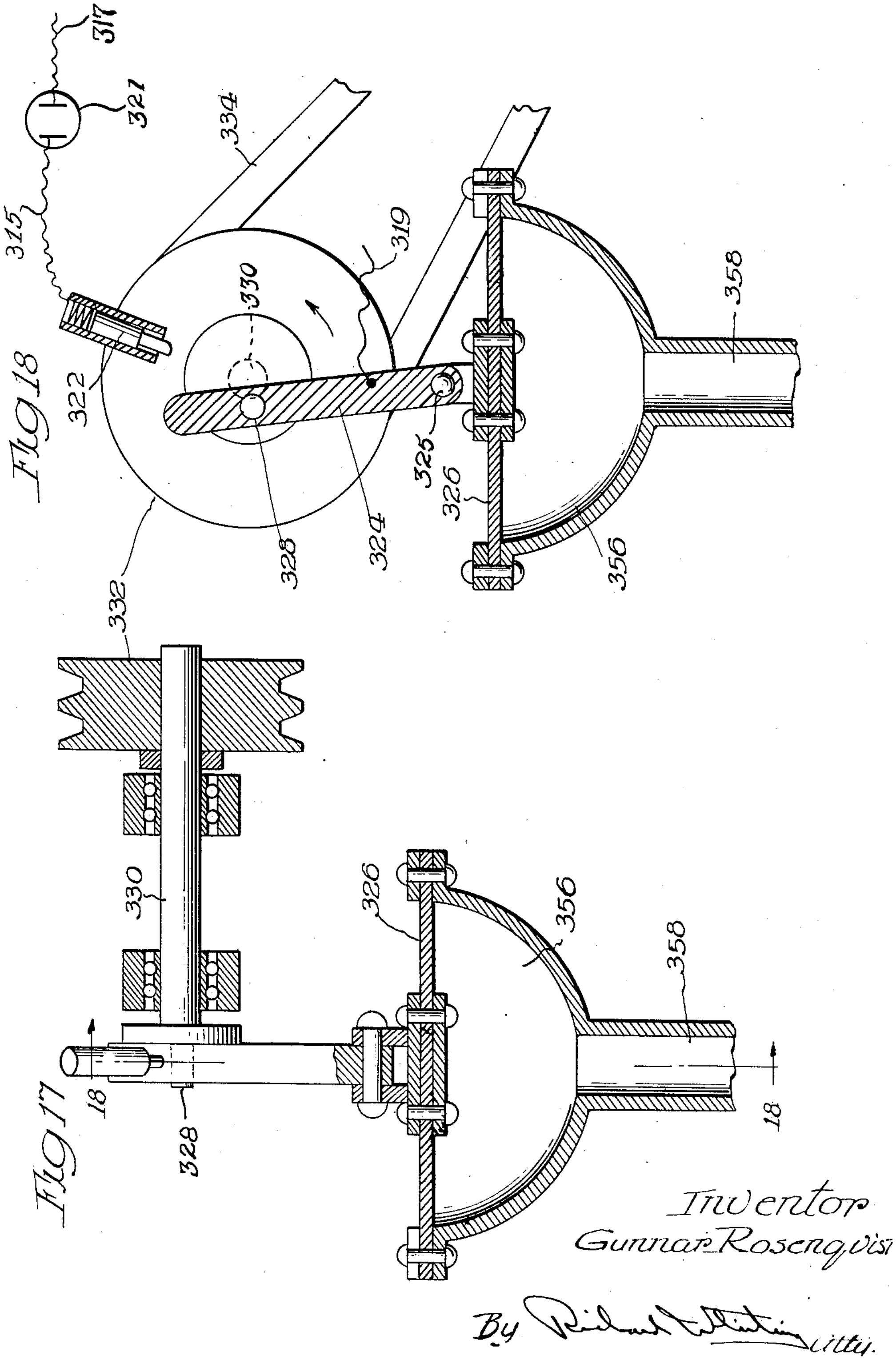

Fig. 17 is a vertical section on an enlarged scale taken on the line 17—17 of Fig. 13.

Fig. 18 is a vertical section on the line 18—18 of Fig. 17.

Figure 19:
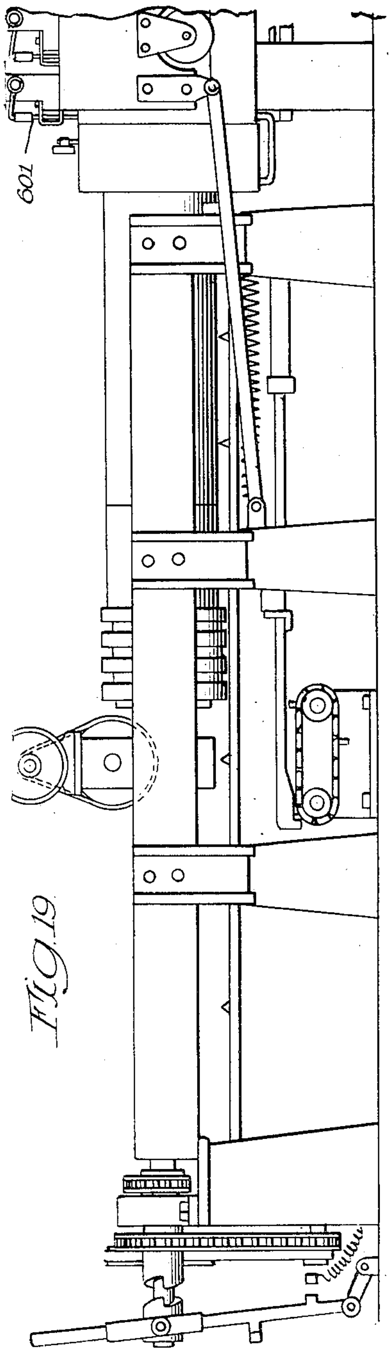

Fig. 19 is a side elevation view of the inlet end of a further embodiment of my machine having certain pressure elements which are caused to dwell against the surface of the metal for a purpose which will appear.

Fig. 19*a* is a side elevation view of the delivery end of that machine—Figs. 19 and 19*a* together showing the complete machine.

Figure 20:
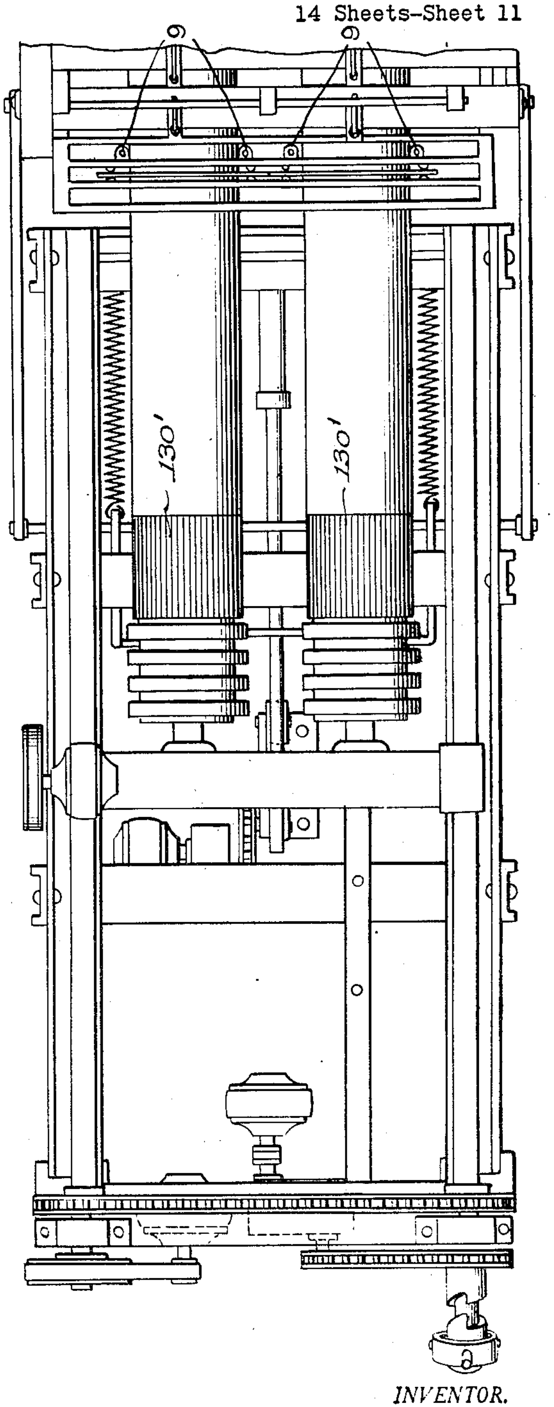

Figs. 20 and 20*a* are plan views corresponding to Figs. 19 and 19*a*.

Figure 21:
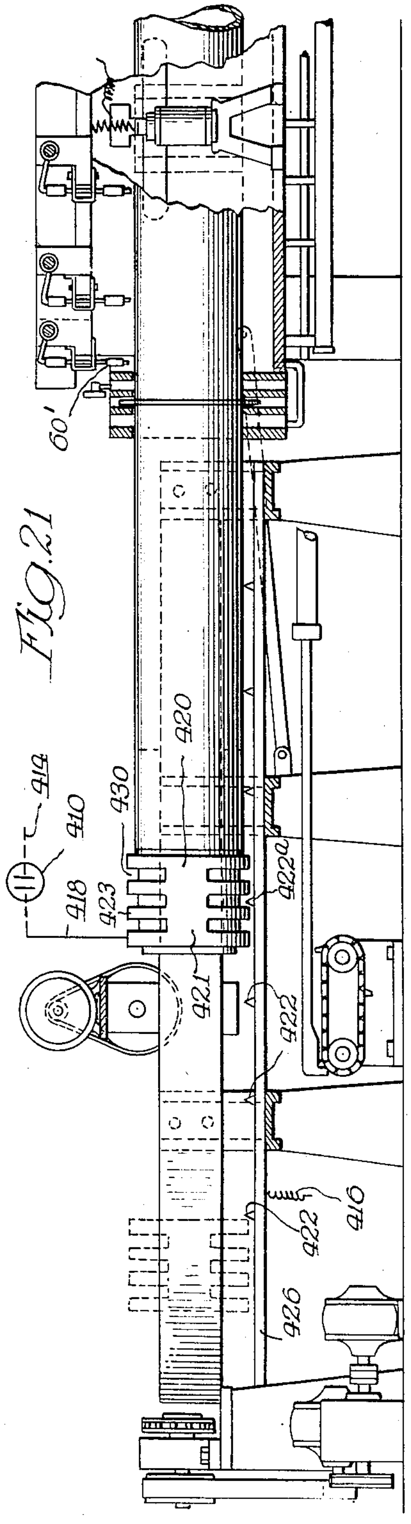

Fig. 21 is a side elevation view corresponding to Fig. 19 with parts omitted.

Figures 22, 23, 24:
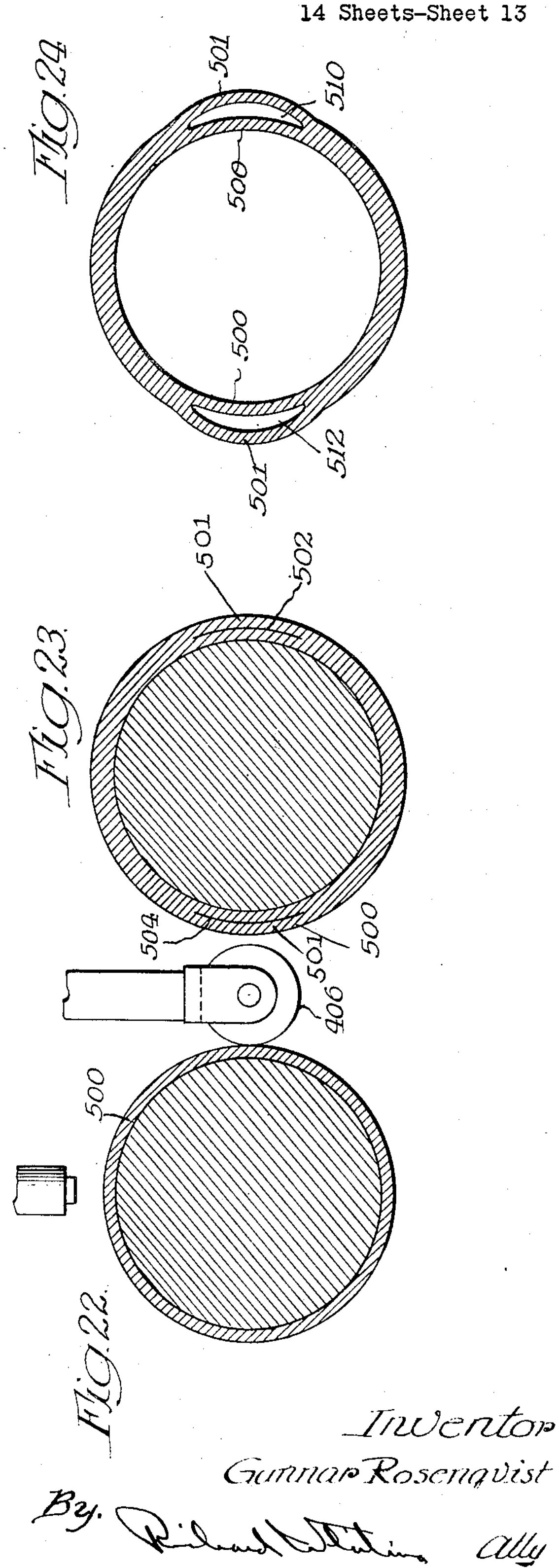

Figs. 22, 23 and 24 are vertical sections through a mandrel and tubing showing progressive stages of the manufacture of the tubing.

Figure 25:
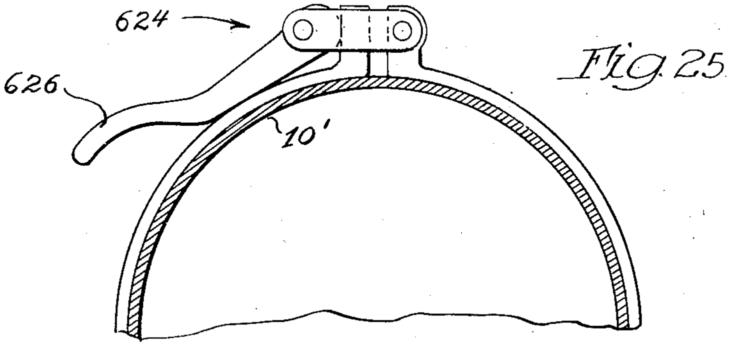

Fig. 25 is a detail vertical section of a portion of the tubing showing a clutch.

Figures 26, 27:
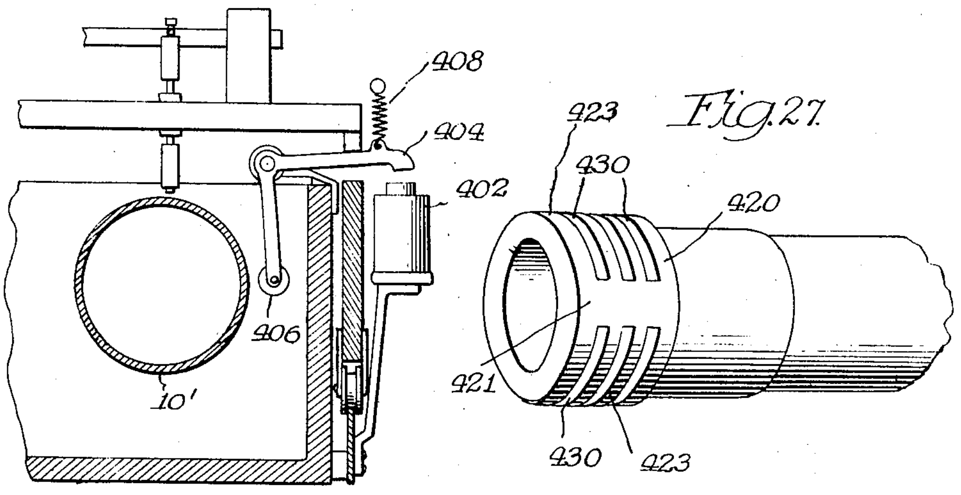

Fig. 26 is a vertical section on line 26—26 of Fig. 19*a*.

Fig. 27 is a perspective view of the pattern mounted on the end of the mandrel.

Figure 28:
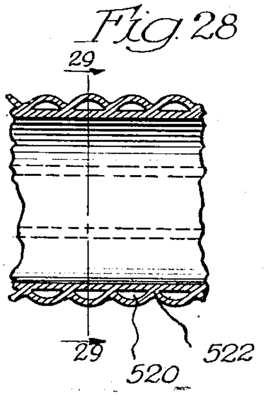

Fig. 28 is a longitudinal section of one form of tubing, and

Figure 29:
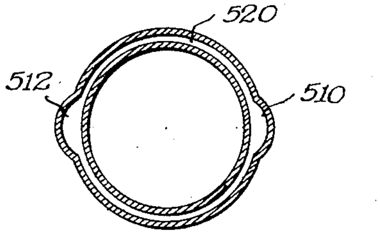

Fig. 29 is a vertical section taken on line 29—29 of Fig. 28.

Figure 10:
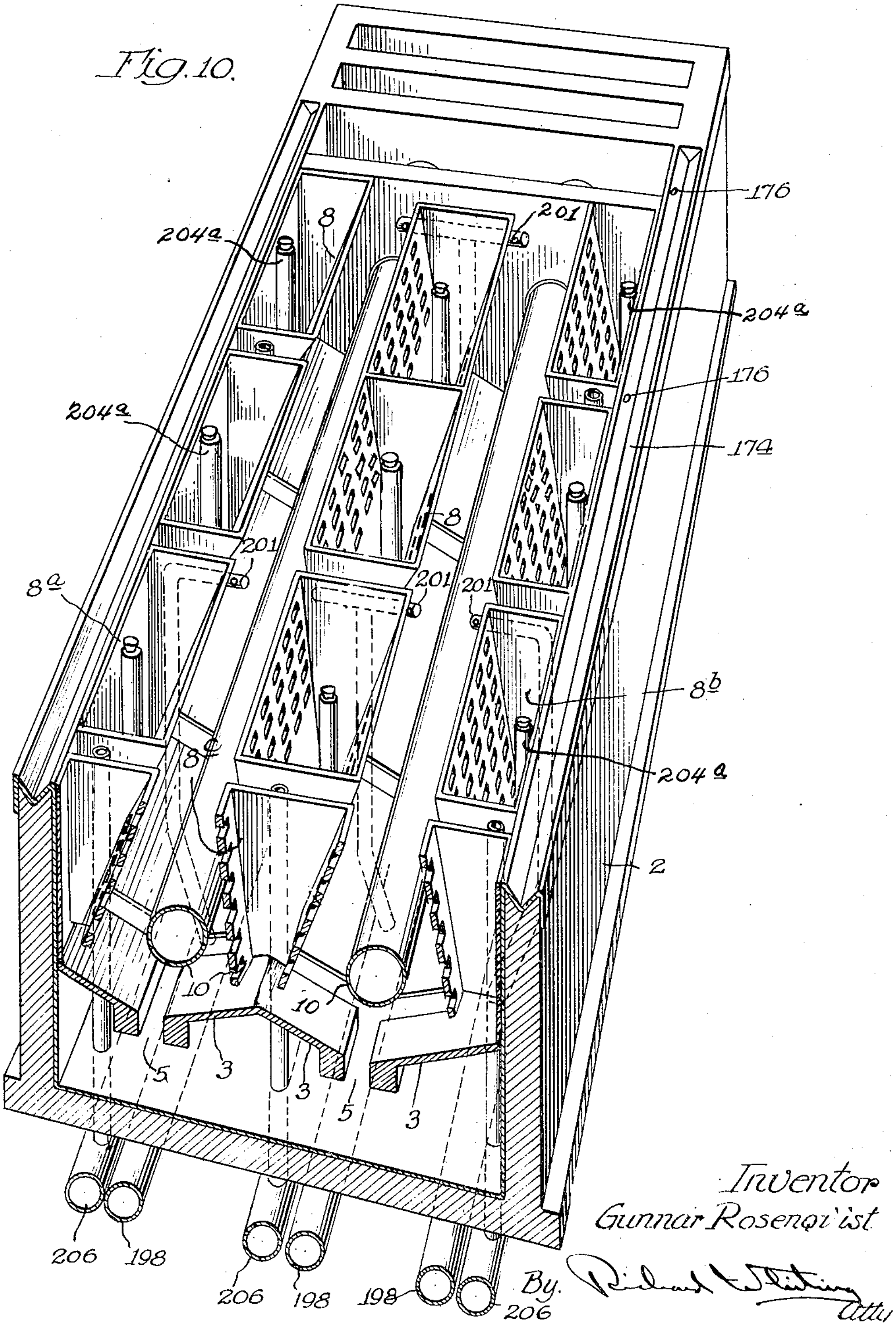
Fig. 10 is a perspective view, looking down into the tank, showing the arrangement of anode baskets and mandrels.

Referring to Figs. 1, 1*a*, 2 and 2*a* the machine has a mandrel-supporting frame 1 and a tank 2 into which the mandrels 10 (shown partly retracted in Fig. 2) may be advanced to receive the electrolytic deposition of metal from electrolyte within the tank 2. The electrolyte supply is stored in tank 4 (Fig. 1*a*) from which it is withdrawn by pump 190 driven by motor 192 pumping the solution from storage tank 4 through pipe 194, manifold 196 (Fig. 4) branch pipes 198 leading to risers 200 which terminate in the outlets 201 (Fig. 10) emptying into the tank 2.

Also within the tank is a supply of copper scrap 6, (Fig. 4) functioning as the anode and retained by the perforate side walls of a number of baskets 8—there being a row of baskets 8*a* (Fig. 10) extending along one side wall of the tank, another row 8*b* extending along the other wall and a row 8*c* extending down the middle of the tank. The perforate side walls of each basket slope downwardly and terminate short of the bottom members 3 (Fig. 4) which in turn slope downwardly to the outlet channel 5 so that the metal scrap anode works its way beneath the mandrels 10 which extend between adjacent rows of baskets as indicated in Fig. 4. The anode sludge collects as a top layer on the free surface between the baskets and being too heavy to rise it does not contaminate the tubing. It is removed periodically by sludge removing rods 226 which lie on the top surface of the anode and are mounted on bent wires 225 whose ends 227 fit loosely in enlarged holes 221. Each rod 226 is pivoted to crank 228 at the right hand end of the machine (Fig. 5) which has its upper end projecting into the path of hooks 229 and 230 secured to a carriage 64, (Figs. 1 and 1*a*) to be referred to. A reciprocating motion which is imparted to the carriage thus periodically shifts the sludge rods to stir the sludge and cause wires 225 to open up small channels through the anode permitting sludge particles to escape through drains 204 to return pipes 206 and thence back to tank 4 where the valuable metals are recovered. To free the drains 204 periodically rods 214 are provided within the tubes 204*a* which may be reciprocated manually when desired.

Electroplating current from a source not shown is conducted to the anode 6 by conductors 11 (Fig. 4) submerged therein and connected to leads 13 which extend to rails 68 (Figs. 1 and 1*a*) to be described, extending lengthwise of tank 2 and also functioning as bus bars. The brush 14 (Fig. 5), connected to the other side of the power source, contacts the external surface of the tubing 12, to render it and each mandrel 10, cathodic.

Figure 1:
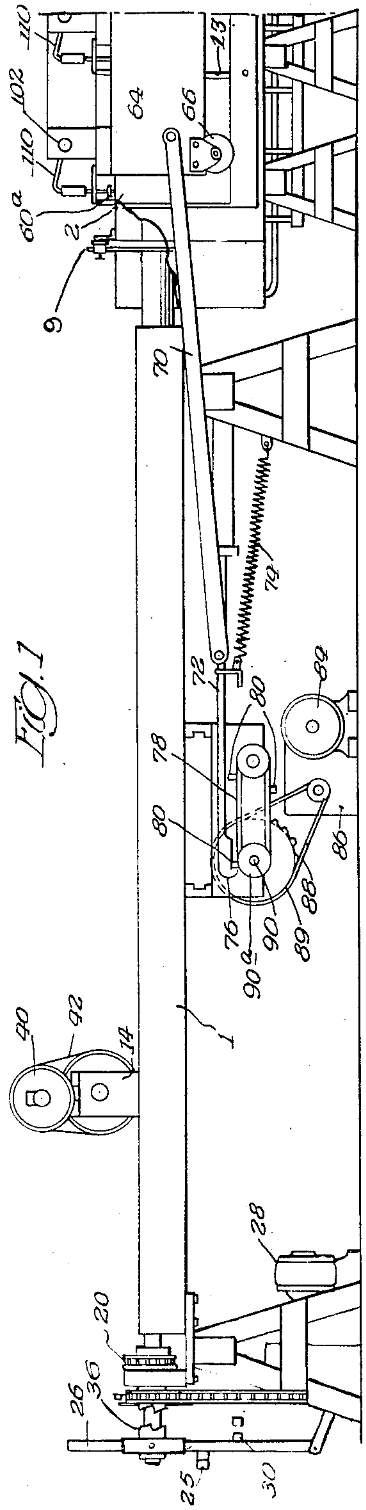
Figure 2:
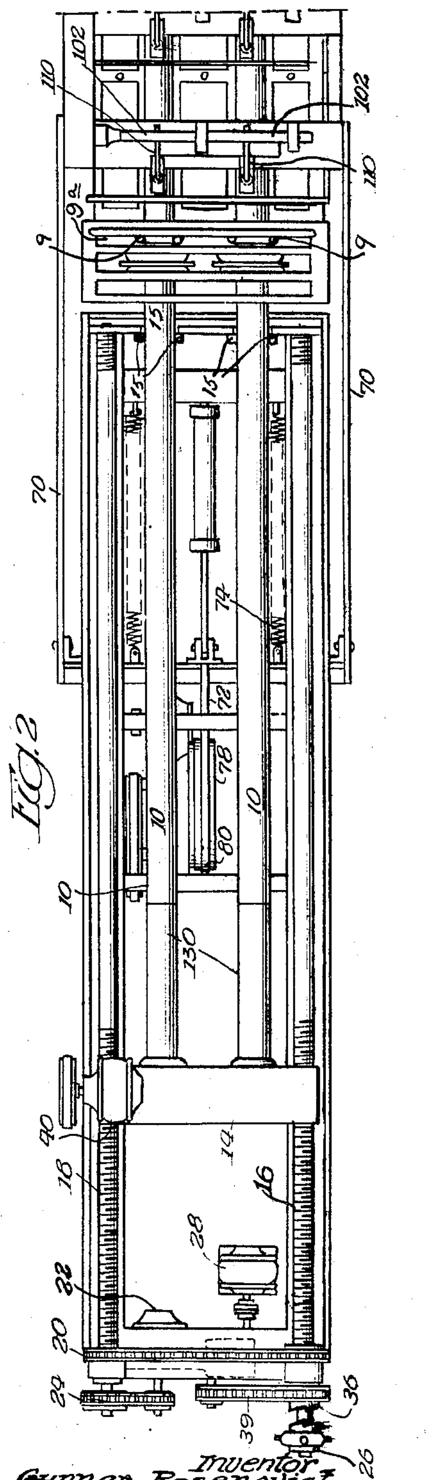

As the mandrel enters the tank it is contacted by rods 9 (Fig. 1) disposed on opposite sides of the mandrel as shown in Fig. 2. The rods are electrically connected to the brush 14 contacting the tubing at the outlet end of the machine. The rods 9 are thus of the same polarity as the brush. The portion of the mandrel contacting these rods is thus in effect anodic with reference to the rods 9 with the result that any plating in the vicinity of the entrance end of the mandrels takes place on the rods 9 rather than on the mandrels. This assures against plating on that portion of the mandrel within the entrance packing. To enhance this effect I place the rods in a compartment 9*a* so they are partitioned from the main body of the tank, the electrolyte communicating through a small opening in the partition.

In operation, the mandrels 10 supported on bearings 15 are advanced to the right to and through tank 2 and simultaneously they are rotated on their own axes. Upon reaching the inner limit of their advancing stroke they are retracted. For this longitudinal movement, the mandrels are supported at their outer ends on a common carriage 14 which is advanced and retracted by feed screws 16 and 18 connected together by sprocket chain 20. Advance of the mandrels is effected by motor 28 suitably connected through chain 39 and clutch 36 to feed screw 16—the motor being driven from a source of current connected to it through switch 30, one terminal of which is carried on lever 26. Retraction of the mandrels is effected by motor 22 connected by chain 24 to feed screw 18—motor 22 being driven from a source of power completed through switch 25, one terminal of which is also carried on pivoted starting lever 26. The carriage 14 is shown about three-fourths retracted in Figs. 1 and 2. When it has been completely retracted to position adjacent the chain 20, lever 26 is pushed inwardly to open switch 25, thereby stopping retracting motor 22 and closing switch 30 to start motor 28, and also engaging clutch 36, thereby completing the drive to screws 16 and 18 to start the carriage on its advancing movement. The mandrels are withdrawn comparatively quickly, in a matter of a few minutes, whereas the advancing time takes a matter of hours, as will be understood in the art.

Power to rotate the mandrels on their axes is derived from motor 40 connected by belt 42 to worm and worm gearing, not shown, within the housing of carriage 14.

As the metal is deposited on the mandrels, which are thus simultaneously advanced and rotated, the metal is subjected to the constant working action of the vertically reciprocating tools or hammers 60 (Fig. 4). These hammers, of which there are a number, are disposed at intervals along each mandrel above and in vertical alignment with its axis and as they are reciprocated, in a manner to be described, they also slowly traverse the mandrels lengthwise. Each hammer is slidably mounted in a bracket 62*a* (Figs. 5 and 8) carried on one of the crossbars 62 of a hammer carriage 64 (Figs. 1 and 1*a*) extending nearly the full length of tank 2 and having wheels 66 running on rails 68. The carriage 64 with its hammers is slowly advanced to the left as viewed in Figs. 1 and 1*a*, a direction opposite to the direction of advance of the mandrels, by linkage 70 and 72, the link 72 terminating in a hook 76 riding on belt 78 having three studs 80 which successively engage hook 76 and pull it and the hammer carriage slowly to the left until the stud 80 disengages latch 76 when spring 74 moves the carriage rapidly to the right to its starting position. Belt 78 is advanced by motor 84 connected through gear reducer 86 and belt 88 to pulley 89 fixed on shaft 90 to which pulley 90*a*, receiving belt 78, is also fixed.

To effect vertical reciprocation of the hammers which thus traverse the mandrels axially, each hammer 60 depends from a crank 110 protruding from rock shaft 102, each shaft being supported in three bearings 104, 106 and 108 (Fig. 4) and carrying a pair of cranks 110 which support a pair of hammers, one for each mandrel. Rocking movement is imparted to each shaft 102 by a crank 100 (Fig. 7) secured to the shaft and carrying a ball follower 98 pressed against hexagonal cam 96 by spring 120*a* extending between the bar 62 and a crank 120*b* (Fig. 8) protruding from the rock shaft 102. Cam shaft 94 extends the full length of hammer carriage 64 and carries a hexagonal cam 96 for each pair of hammers. The shaft is rotated by belt 92 (Figs. 4 and 5) driven by motor 91. The hexagonal cams 96 are set in different positions on shaft 94 so that the hammers do not act simultaneously. This minimizes vibration and it also saves power particularly where there are more than two mandrels and a correspondingly large number of hammers.

Figures 1A, 2A, 3A:
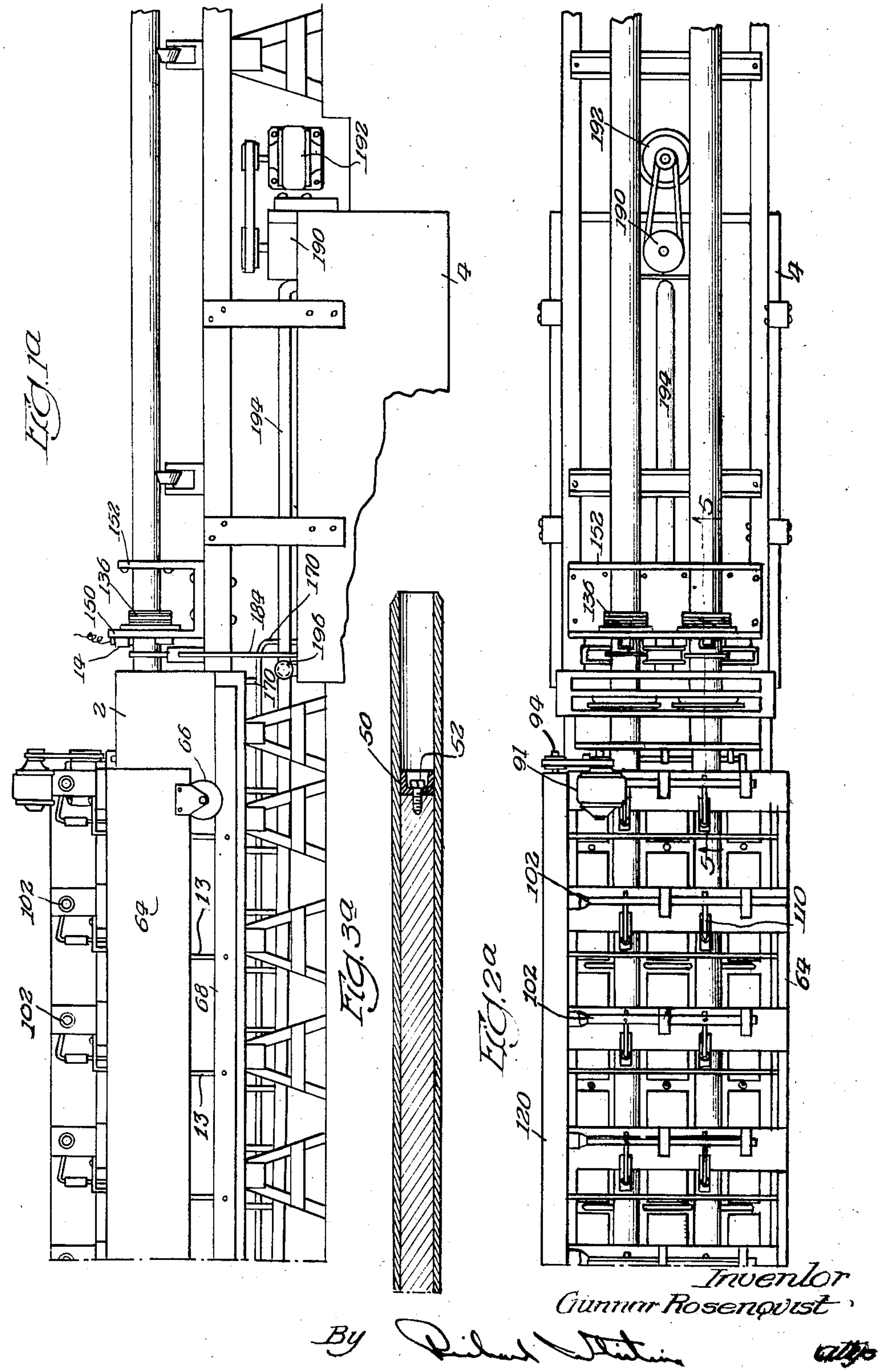

The cam shaft and the cam followers coordinating therewith are properly lubricated and are enclosed in a housing 120 extending substantially the full length of the tank, as indicated in Figs. 2 and 2*a*. To prevent seepage of oil from the housing around the rock shafts 102 and thence into the electrolyte I provide, for each rock shaft, a sleeve 104 secured to the side of the box 120 and through which the rock shaft 102 passes, the sleeve being in turn enclosed in an outer sleeve 122 of rubber-like material extending beyond the metal sleeve 104 and tightly embracing the rock shaft 102. The bearings 106 and 108 are made of a rubber-like material tightly embracing the shaft and in turn embraced by supports 107; thus the rubber-like material yields to permit rocking of the shaft and the need for an oil lubricant is obviated.

The hammers, being made of metal, are electrically conducting. To minimize electroplating on their submerged portions they are encased in insulating material 61 (Fig. 6) leaving only the end 63 exposed and that end portion is made of a metal to which plating metal poorly adheres (i. e. for copper, stainless steel) and is convexed so that any adhering metal will tend to fall off.

As stated above it is one of the primary objects of my invention to provide method of and apparatus for effecting the hammering in which relative lateral motion between the hammer and the deposited metal is avoided. Thus (Fig. 6), it will be noted that when follower 98 is on the lowest portion of cam 96 the tip 63 of the hammer does not contact the mandrel or the metal deposited thereon but is displaced therefrom a substantial distance. To effect the hammering I provide a yielding connection between the cam follower and the hammer and utilize the momentum of the rapidly reciprocating hammer to carry it into impact with the metal on the mandrel. The yielding connection comprises the rubber tubing 114 connected at its upper end to the tip 112 of the crank 110 and at its lower end to the hammer 60. In operation the momentum of the hammer is adequate to carry it against the metal on the mandrel and yet when the impact has occurred the hammer is immediately retracted from the metal through contraction of the rubber connection 114. Thus the complete hammering stroke involves three steps which are independent of each other, namely, first striking the metal on the cathode, second, immediately breaking contact with the metal through the contraction of the rubber and, third, retraction of the hammer for the next succeeding stroke by the next rise on the cam 96. Thus the step of breaking contact is independent of the step of retraction of the hammer by the cam. Thereby I assure against any frictional abrasion of the hammer against the metal.

In Figs. 11*a* and 11*b* and 11*c* I have shown diagrammatically on greatly enlarged scale the working action thus effected. The reference *a* designates the hammer or tool approaching the metal *b* in a direction substantially perpendicular to the cathode surface *c* as indicated by the arrow *d*. On the cathode surface *c* are protrusions *e* formed by crystal growth during the electrodeposition.

In Fig. 11*b* the hammer *a* has pressed against the protrusions *e* in a direction normal to the surface of working contact as indicated by arrows *f* causing the metal particles to flow within the cathode surface *c* as indicated by the arrows *g*. The pressure thus applied continues until the protrusions are flattened and surface *c* is continuous and is entirely level. It will be noted that during this hammering action the hammer *a* has not moved laterally in contact with the surface *c* or the protrusions *e* thereof. After the hammering has been completed the electrodeposition continues, with further periodic hammering until the desired thickness is obtained as indicated by Fig. 11*c* wherein, it will be noted, that the internal metal structure is entirely free of flaws, or laminations.

This method of hammering is to be contrasted with that illustrated in Figs. 11*x*, 11*y*, and 11*z*, wherein the tool *a* moves laterally in relation to the surface *c* as designated by the arrow *h* and, by frictional abrasion, moves the protrusions *e* and displaces first one (Fig. 11*x*) and then the other (Fig. 11*y*) laterally of the cathode surface to positions *e'* where they may be loosely superimposed on the outside of the surrounding cathode surface. After further electrodeposition the completed structure is typified, as shown in Fig. 11*z*, by pockets *p* containing electrolyte. For certain purposes these pockets have a useful function, as will be hereinafter referred to. The action of the tool *a* in laterally displacing metal particles where frictional abrasion occurs, as illustrated in Figs. 11*x* to 11*z*, is not confined to the displacement of protrusions *e*, as non-protruding portions of the surface are similarly displaced. These views are merely diagrammatic and do not, of course, indicate the complex physical changes taking place when pressures are applied to a cathode surface. However, they will serve to illustrate the principle of my invention.

Figures 6, 7, 8, 9:
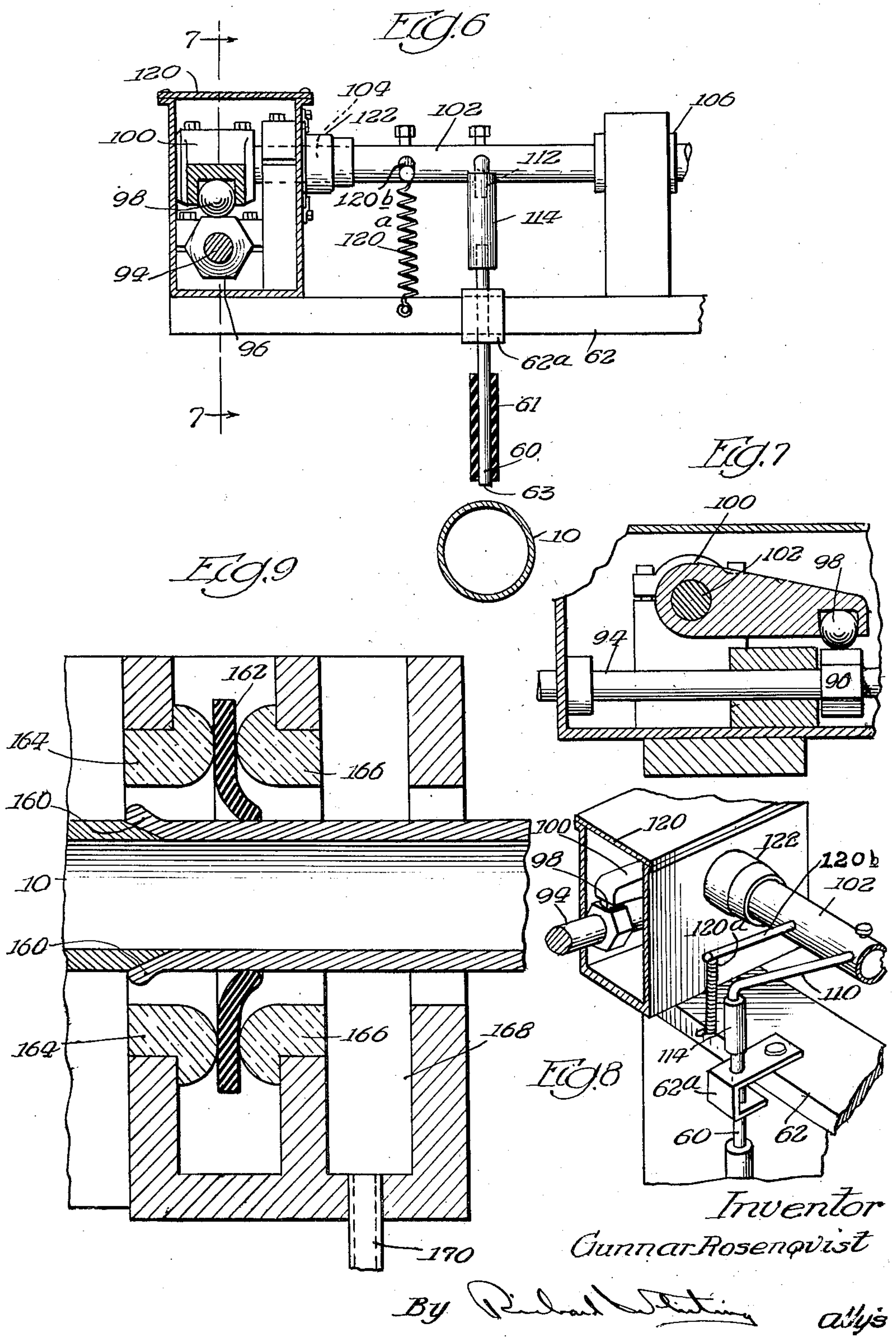
Fig. 6 is a detail elevation view of a hammer and associated parts, partly in section.
Fig. 7 is a detail vertical section along the line 7—7 of Fig. 6.
Fig. 8 is a detail perspective view of the hammer of Fig. 6.

When the hammer mechanism constructed as described with reference to Figs. 6 to 8, inclusive, are employed the working action illustrated in Figs. 11*a*, 11*b*, and 11*c*, effecting displacement of the metal particles only inside the cathode surface, is obtained and the frictional abrasion of Figs. 11*x*, 11*y* and 11*z*, resulting in outside displacement, is avoided. It might be surmised from the fact that the hammer in Figs. 6 to 8 inclusive strikes a cathode surface which is moving continuously in a lateral direction relative to the hammer that of necessity there would be, at least to some degree, lateral relative movement or frictional sliding of the hammer while it is in contact with the cathode. However, in the above described embodiment of my invention such is not the case for a number of reasons; first, I guide the hammer for reciprocation in a direction normal to the cathode surface to avoid an oblique glancing blow which itself would cause lateral relative motion during working contact between the cathode and the hammer; second, the blow which is thus in a normal direction, is with a rebounding stroke so that the hammer breaks contact with the cathode immediately the blow has been struck and the opportunity for lateral relative movement or frictional sliding is virtually non-existent as will be further appreciated from the fact that in my machine the cathode and hammer move laterally relative to each other only about one-twentieh of an inch during a complete hammer reciprocation. Finally, the hammer guides permit a very minute lateral play of the hammer so that the hammer can move laterally very slightly with the cathode. During striking the pressing force is strong enough to prevent any potential slight frictional forces created by the rotation of the mandrel during striking contact from causing frictional sliding and the only possible difference in working action caused by such rotation is therefore that the direction of the resultant working force very slightly deviates from the true normal direction thereby still causing only inside displacement of the metal particles. This mode of operation is to be contrasted with hammers which after striking are allowed to dwell in contact with the cathode surface and are not retracted therefrom immediately after the striking force is spent. In such a device the pressing force becomes weak after the impact with the result that the direction of the resultant working force suddenly deviates from the normal sufficiently to overcome frictional resistance and produce frictional sliding, resulting in displacement of metal particles on the outside of the cathode surface.

Where sound metal is desired frictional sliding resulting in outside displacement of metal particles cannot be tolerated no matter how minute, because the pockets thereby formed cannot be eliminated as is the case with the pores or bubbles always present in commercial ingots and which are usually "repaired" or fused during the heat treatment applied between the working operations. The heat treatment of electrolytic metal having pockets with enclosed plating solution makes the imperfections worse rather than improves them because as explained above such heat treatment is effective merely to increase the vapor pressure of the entrapped plating solution, thus enlarging the pockets. The seriousness of this result can be appreciated from the fact that in electrolytic manufacture the hammering, and thereby the pockets if the hammering is faulty, is in planes occurring at intervals of about one two-thousandths of an inch through the cross section of the metal. In the measurements I have made of the pockets made by faulty hammering I have observed many individual pockets of less than one thirty-two-thousandths of an inch in diameter which is an indication of the microscopic dimensions of the frictional sliding to be avoided.

A further and important function of the hammering operation is that it stretches the metal and loosens the tubing from the mandrel so the mandrel may be withdrawn from the tubing, as will be described.

Contributing to the practicable manufacture of tubing continuously on a mandrel of predetermined length alternately advanced through the electrolyte and then retracted to starting position, are certain safeguards embodied in my preferred form of machine to obviate electrodeposition of metal on the mandrel during its retraction.

Fig. 4*a* illustrates a clutch 136 made of annular rings of metal 138 *a*, 138*b*, and 138*c* alternating with rubber rings 140, all secured together by bolts 142. This clutch fits over the finished tubing 12 on the outlet side of the machine and the internal diameter of the rubber rings 140 is considerably smaller than the external diameter of the tubing. Movement of the tubing to the left relative to clutch 136 is resisted by the action of the inner margins 146 of the rubber rings being squeezed between the tubing 12 and the shoulders 148 on the inside edges of rings 138*a* and 138*b*. The tubing is, however, free to move to the right relative to the clutch because in such movement the inner margins 146 of the rubber rings turn to their full line positions shown in Fig. 4*a* where no wedging occurs. Clutch 136 may move with the tubing between the opposite limits indicated by stop 150 (Fig. 1*a*) and stop 152 secured to the frame. This arrangement is effective for a purpose which will appear.

To assure an adequate grip between the mandrel and the tubing formed thereon so that when the mandrel advances into the tank the tubing is carried along with it I provide (Fig. 3*a*) an internal clutch in the form of a rubber ring 50 secured to the end of the mandrel by bolt 52. The ring is oversized so that when the mandrel advances to the right the ring is squeezed against the inside of the tubing but permits the mandrel to be retracted to the left free of the tubing.

Figure 3:
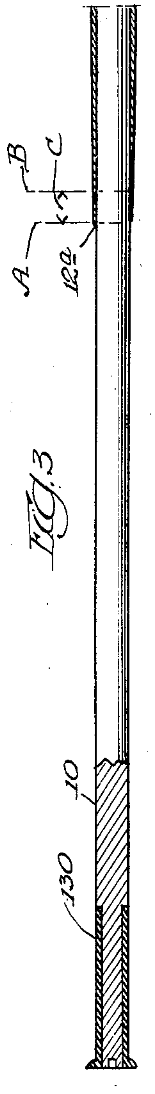

Fig. 1 shows the hammer carriage 64 in nearly its extreme position to the left. Fig. 3, for reference purposes, shows a mandrel during its retraction. The reference line A indicates the location of the end wall of the tank and it will be noted that the edge 12a of the tubing 12 is disposed in an opening in the tank wall during retraction of the mandrel. The reference line B indicates the position of the extreme left hand pair of hammers when the hammer carriage is fully retracted to the left. That hammer line is spaced from the end 12a of the metal tubing by a distance C.

Figures 12, 12A, 12B, 12C:
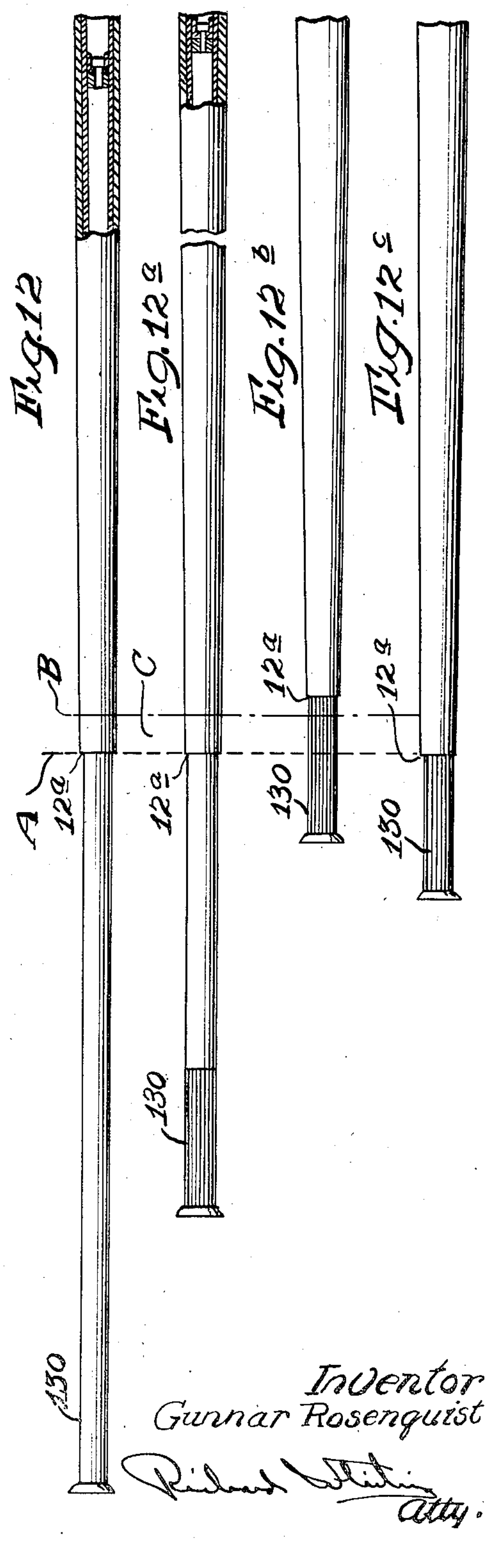

In operation when the mandrel is being retracted as shown in Figs. 1, 2 and 3 clutch 136 abuts stop 150, at which time the margins 146 (Fig. 4a) of the rubber washer in clutch 136 are wedged between the shoulders 148 and the tubing 12 so that the tubing is held while the mandrel is withdrawn from within it. As the trailing edge 12a (Fig. 3) of the tubing is at this time lodged in an opening in the end wall of the tank, the mandrel is effectively shielded from the electrolyte so that no electrodeposition at this time occurs. The retraction continues to the full limit indicated in Fig. 12. The advancing movement of the mandrel then commences and during the initial portion of this movement the clutch 136 is carried along with the tubing until it abuts the stop 152 when it is held and the rubber disk margins 146 move over to their full line positions (Fig. 4a) so that the tubing may continue to move relative to the clutch. Fig. 12a shows the position of the parts after they have advanced part way and Fig. 12b shows the inner limit of the advancing stroke.

The trailing edge 12a of the tubing continues to build up during the advancing movement of the mandrel and, as the result of the continuous accretion, the edge, in effect, remains at the entrance end of the tank. The mandrel, adjacent its head, is insulated from the electrolyte by a short, countersunk (Fig. 3) section of rubber tubing 130. As soon as this insulated portion enters the tank no further deposition occurs on that portion of the mandrel directly inside the tank end wall and the continued advance of the mandrel moves the trailing edge 12a of the tubing inwardly, past the hammer line, to its extreme position of Fig. 12b.

As the next retracting stroke occurs, the tubing moves to the left with the mandrel until the position of Fig. 12c is reached, such limited movement of the tubing being permitted by the movement of the clutch 136 carried by it and the Fig. 12c position is reached when the clutch hits the stop 150, whereupon the inner margins 146 of the rubber ring are again squeezed against the tubing to hold the tubing with its trailing edge 12a in the end wall of the tank during the remainder of the retracting stroke.

The hammers, even when in their extreme positions to the left along the line B, do not hammer the thin metal deposit initially formed near the edge 12a which is too weak to withstand hammering because that initial deposit occurs along the line A, spaced from the hammer line B by the distance C. When the trailing edge 12a eventually moves under the hammer line B, it is not very thin but has been built up by electrodeposit while it is in the position A and while it was moved through the distance C.

Figure 9:
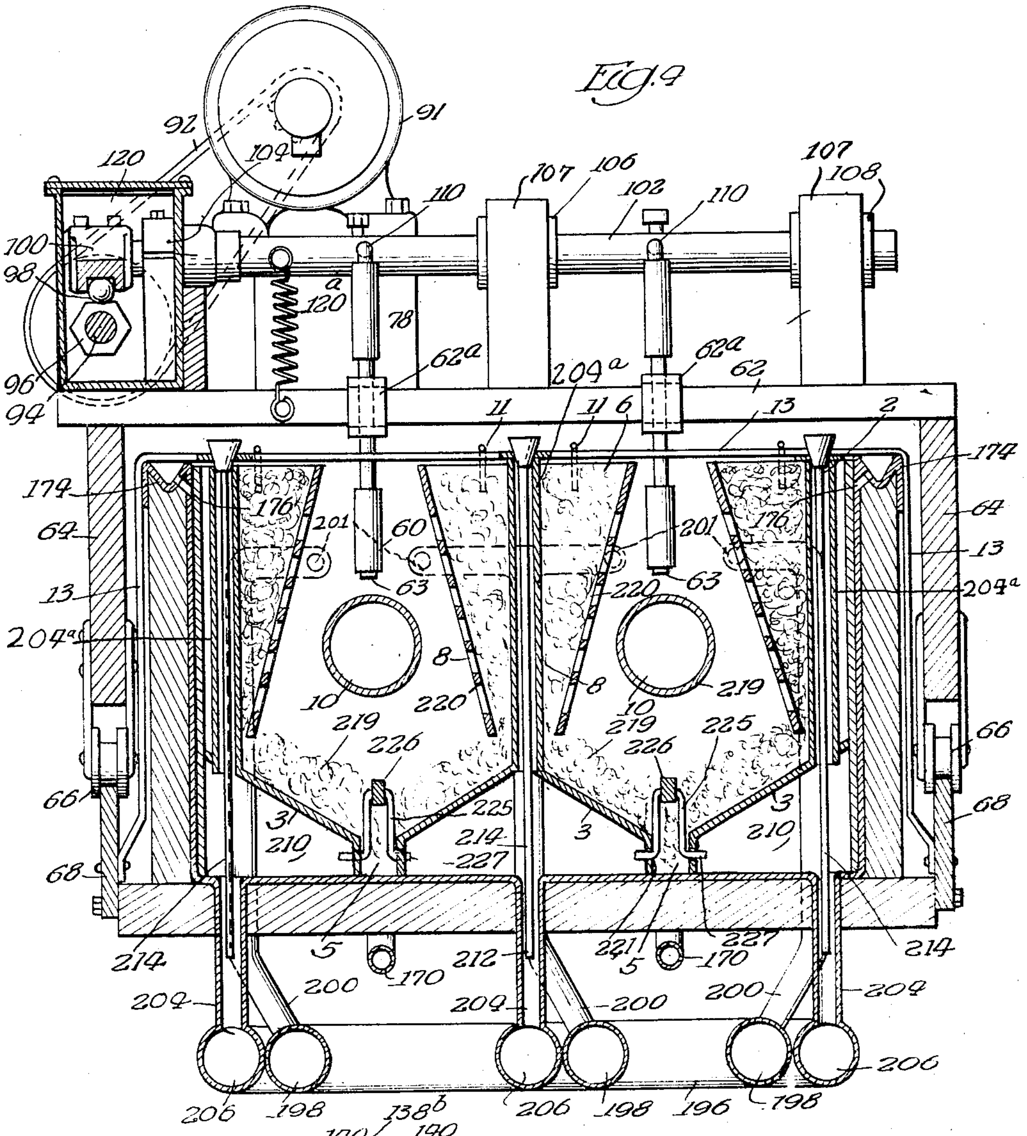
Fig. 9 is a detail vertical section of a novel type of seal at the delivery end of the machine.
Figure 9A:
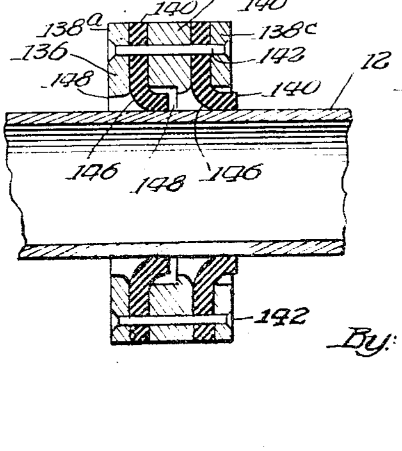

At the juncture between the trailing edge 12a of the tubing and the next succeeding metal deposit a ridge 160 (Fig. 9) forms. An elastic seal is provided in the wall at the outlet end of tank 2 which will hold in the electrolyte and yet permit passage of the ridge. A similar seal is provided at the entrance end. This seal consists of a rubber disk 162 having an internal diameter smaller than the external diameter of the completely formed tubing to fit the tubing snugly and rotate therewith. The rubber disk loosely fits between opposite glass rings 164 and 166 and slides easily between them, thus minimizing wear. Leakage beyond the ring 162 is caught in the chamber 168 and returned by pipe 170 to the storage tank 4. Around the top edge of the working tank 2 is provided a groove 174 (Fig. 4) to which water is suitably conducted. A number of drain orifices 176 drain water into the working tank 2, thus replacing water lost by evaporation. I have found that the groove 174 is effective to catch and redissolve any plating salt creeping over the edge of tank 2 so that I thereby reduce loss of salt and short circuits around the machine.

Figure 5:
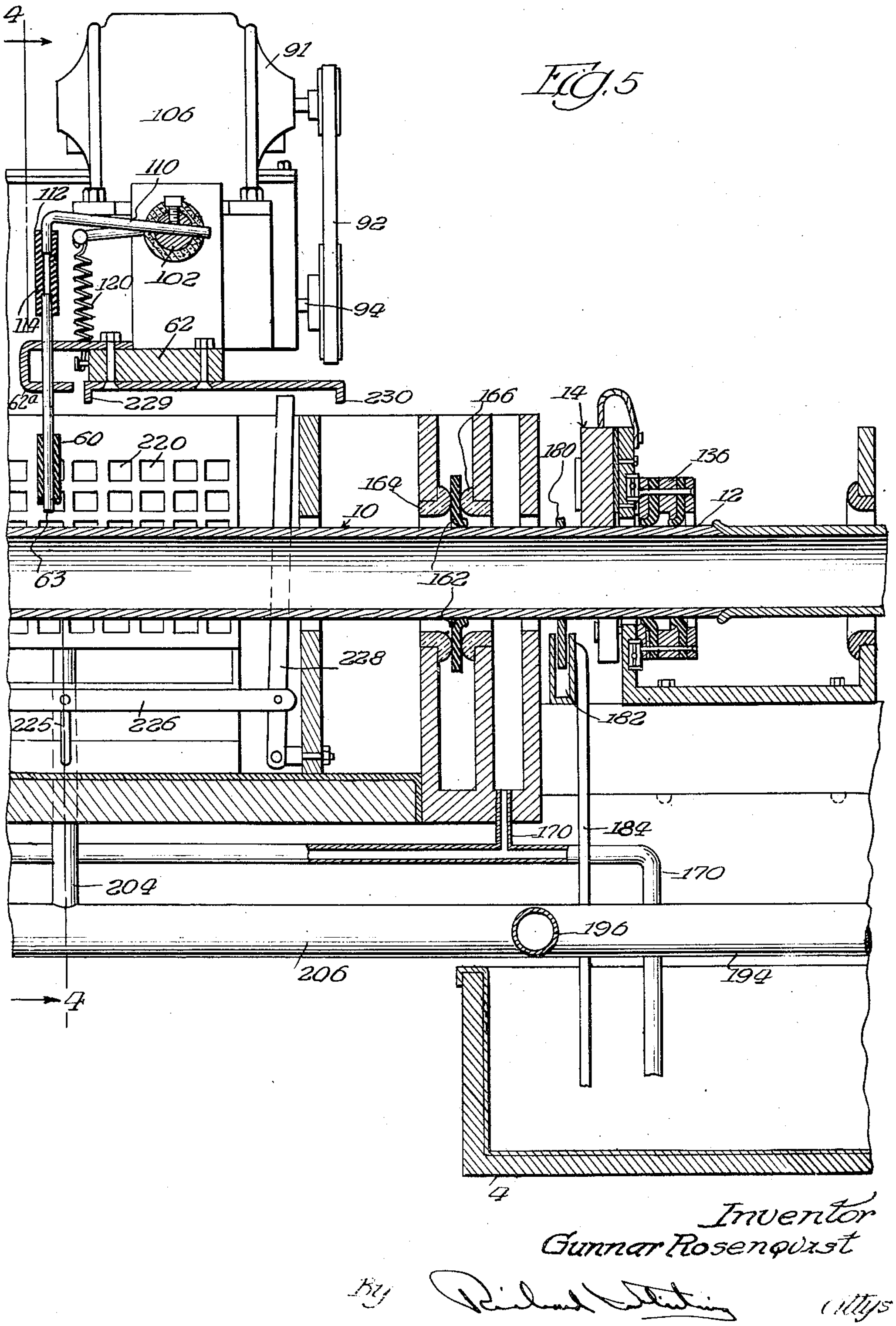
Fig. 5 is a vertical section along the lines 5—5 of Fig. 2*a*.

To wash the tubing as it emerges from the tank, for like purpose, I provide a washing ring 180 (Fig. 5) dipping into a water container 182 which drains into the storage tank 4 through drain pipe 184, see Fig. 5.

Referring to Figs. 13 to 18, inclusive, I have shown therein a modification which utilizes a different principle to insure against any relative movement of the electrodeposited metal and the hammer at the instant of contact, namely, by moving the deposited metal intermittently and hammering only during the dwells in such movement. The machine is shown as making a continuous sheet of metal, but that is illustrative only, as the machine may as well be designed for making tubing or other articles.

The drum 300, with rubber-covered ends 300', advanced in the direction of the arrow in Fig. 13, receives the metal deposit which is removed in sheet form as shown at 273 and is led through a washing vat 274 and wound upon the spool 275. The drum is enclosed in a tank formed of an outer wall 305 having a lining 306 enclosing copper scrap 308 confined inwardly by the cylindrical perforated retaining member 306a spaced from the surface of the drum 300 and extending concentrically therewith. 304 is a cloth lining which may be used. 310 indicates the electrolyte. Suitable electrical circuits are employed, as will be understood.

The drum 300 is mounted on a shaft 302 supported in bearings 304 and 306'. A rubber washer 301 fitting closely around shaft 302 presses slidably against glass rings 303 to minimize leakage of electrolyte 310 out of the tank 305. Any seepage is caught in chambers 307 and drained away to a supply tank not shown from which the solution is circulated back into the working tank through a pump.

To rotate drum 300, ratchet 308' is employed, secured to the shaft of a worm 310 meshing with worm gear 312. Step by step rotation of ratchet 308' is effected by pawl 314 carried on the core 316 of solenoid 318 and urged to the left as viewed in Fig. 14 by spring 320. Circuit to solenoid 318 is completed through wire 317 from a power source 321 (Fig. 13) and lead 315 to switch element 322 contacted by the element 324 pivoted at 325 to diaphragm 326 and pivoted at 328 eccentrically of the shaft 330 driven by pulley 332 rotated by belt 334. By this arrangement, when contact is made between elements 322 and 324 of the switch, ratchet 308' will be advanced the distance of one tooth, thereby imparting a rotational movement to the drum 300.

Arranged around the periphery of the drum 300 are a number of hammers or tools 350 mounted in a holder 352 (Fig. 15) of the shape indicated and made of a resilient material such as rubber. Each holder 352 extends for substantially the entire length of the drum and carries, suitably spaced apart, a number of hammers 350, see Fig. 16.

The aforesaid diaphragm 326 forms the top closure of a pressure chamber 356 communicating by tube 358 with orifices 360 shaped as indicated in Fig. 15 and extending nearly all the way through the resilient holders 352 as indicated in Fig. 16. The orifice 360 in each holder 352 communicates by another section of tubing 358 with the corresponding orifice in the next succeeding holder so that pressure in the chamber 356 created by a downward movement of diaphragm 326 will be communicated to the orifices in all of the holders 352. Because of the resilient construction of the holders, such air pressure causes the orifices to dilate as indicated at 360*a* in Fig. 15*a*, thereby forcing the hammers 350 against the metal deposited on the surface of drum 300.

Thus, in operation, when drum 300 is rotated by contact of switch elements 322 and 324, the diaphragm 326 will be in its upward position so that there is a minimum pressure in the chamber 356 and the rubber holders 352 are contracted with hammers 350 clear of the drum and the metal thereon, as indicated in Fig. 15. However, after the drum has thus been advanced, and while it is held stationary, further rotation of pulley 332 depresses the diaphragm thereby creating in chamber 356 sufficient pressure to cause hammers 350 to press firmly against the metal on drum 300, as indicated in Fig. 15*a*.

In the embodiments of my invention above described the effort has consistently been to avoid any lateral relative movement between the hammer and the deposited metal during contact because of the laminations which I have found resulted therefrom. I shall now describe a further embodiment which employs, in addition to the hammers which so operate, a supplemental pressure applying element that is allowed to dwell against the surface of the deposited metal purposely to provide frictional contact and thereby to form laminations in selected areas. An article made with such laminations is useful for making such articles as heat exchangers and the like.

Referring to Figs. 19 to 29, inclusive, I have shown a dual-mandrel, tube-manufacturing machine similar to the machine of Figs. 1 to 12, inclusive, except as will appear.

Suitably mounted on opposite sides of the working tank 2' are electromagnets 400 and 402 (Fig. 20*a*) one for each of the mandrels 10'. Pivoted to the side wall of the tank in position to be acted on by each of these electromagnets is a bell crank 404 (Fig. 26) one arm of which carries an etched glass roller 406 and the other arm of which, shown retracted by spring 408, is adapted to be attracted by magnet 402 to press the glass roller 406 against the metal on the surface of the mandrel 10'.

The electromagnets 400 and 402 are energized simultaneously from a power source 410 (Fig. 21) by parallel identical circuits, typically illustrated by wire 414 leading to magnet 400 and by wire 418 leading to pattern cylinder 420 adapted at times to make contact with one of a series of points 422 on rod 426 connected by lead 416 back to each magnet.

Cylinder 420, as shown by a comparison of Figs. 21, 20 and 27 is cut away in parallel recesses 430 extending circumferentially all the way around the cylinder except as interrupted by area 421 on the side of the cylinder seen in Fig. 21 and an identical area, not seen, on the opposite side. These areas, together with the areas 423 between recesses, constitute, in the aggregate, what I shall call the contacting area of the cylinder and the recesses constitute the non-contacting area.

A pattern cylinder thus formed is mounted on the end of each mandrel 10' and is adapted to rotate and to be advanced and retracted therewith.

As each mandrel with its pattern cylinder advances from its retracted position shown in dotted line in Fig. 21, its contacting areas electrically close circuit with the first point 422 and this circuit is maintained until the cylinder passes that point, except as it is interrupted by the non-contacting areas. The space separating successive contact points is, in the embodiment illustrated, slightly greater than the length of the pattern cylinder.

In practice I have found that in the areas of the deposited metal contacted by the glass roller fine metal particles are ground off the surface and then immediately mechanically redeposited, the deposit being of very minute particles analogous to the deposit of graphite particles made when a pencil marks a sheet of paper. Indeed, as an alternative, I could employ a graphite pencil rubbing against the cathode to produce the same surface deposit. In enlarged scale I have shown this action diagrammatically in Figs. 11*x*, 11*y*, and 11*z* wherein is indicated how laminations are formed in the metal structure. As I have stated, a small quantity of electrolyte becomes entrapped between such laminations so that when the tubing is thereafter heat-treated the laminated areas expand from the vapor pressure of such electrolyte. Thus, in Fig. 22 the glass roller 406 is shown contacting the surface layer 500 of metal that has been deposited during the advancing movement of the mandrel from the time it entered the tank until it arrived opposite the roller 406. Thereafter, following the contacting, the surface of the metal thus contacted advances with the mandrel beyond the reach of the roller 406 and during its progress from the roller to the end of the tank, a further annular layer of metal 501 is added to the layer 500. Assuming that, in the operation of Fig. 22, the engagement of the roller occurred as the result of a contact point in the position of 422*a* of Fig. 21 wherein it makes electrical contact with the pattern cylinder only in the areas 421 on opposite sides of the cylinder and not in the recess 430, a lamination 502 will be formed on one side of the cylinder and a corresponding lamination 504 will be formed on the opposite side. After electrodeposition is completed and the cylinder is removed, it is then heat-treated and the entrapped moisture causes expansion of the laminated areas as illustrated in Fig. 24 to produce pockets 510 and 512 bounded on the inside by the metal 500 deposited prior to the action of the roller and on the outside by the metal 501 deposited after the lamination was formed.

Using a pattern cylinder of the configuration shown, a chambered tubing of the sort illustrated in Figs. 28 and 29 would be formed having channels 520 resulting from contact with the areas 423 of the pattern cylinder, connected portions 522 corresponding to the non-contacting areas of the cylinder and the side channels 510 and 512 corresponding to the opposite areas 421 on the cylinder, and affording communication between successive channels 520.

In order not to interfere with the accuracy of reproduction of the pattern, I prefer not to utilize the mode of operation described with reference to Figs. 1 to 12, inclusive, wherein, during the initial retraction of the mandrel, the tubing is retracted with it to the entrance wall of the tank, to shield the mandrel from electrolyte during its further retraction. When using the glass roller or its equivalent I modify the operation of the machine in the following respects:

The rubber collar 130' is shorter than the rubber collar 130 so that when the mandrel is in its fully advanced position the collar just reaches within the entrance opening of the tank. When the mandrel is thereafter retracted there is little space between the trailing end of the tubing and the end wall of the tank through which electrolyte could reach the mandrel. To loosen the tubing from the mandrel prior to its retraction the end pair of hammers 601 are so mounted on the hammer carriage as to hammer right up to the end wall of the tank or to the end of the rubber collar protruding slightly therethrough. During the major portion of operation of the machine this end pair of hammers is disconnected from its actuating cam so that the thin initial portion of the tubing is not then hammered. When the mandrel is fully advanced its axial movement is then stopped for a brief interval to allow the trailing edge to build up in thickness sufficiently to withstand hammering. When this has been accomplished, the end hammers 601 are set in operation and thereafter the mandrels are retracted. Fig. 25 illustrates a hand chuck that may be used to hold the tubing stationary while its trailing end is thus being built up. This chuck, designated generally at 624 completely encircles the tubing 10' and may be either contracted tightly against it by depressing the lever 626 or may be expanded for freedom of movement relative to the tubing by raising the lever. As shown in Fig. 19*a* the chuck 624 is interposed between thrust bearings 630 and 632 backed up by brackets 636 and 638, respectively. By this mechanism the tubing can rotate and move either way axially when the chuck is open but cannot move axially when the chuck is closed.

I claim:

1. The method of working electrolytically deposited metal by intermittently applying pressing forces to the metal as it is deposited on a continuously moving cathode surface while inhibiting the creation of pressure components in directions parallel with the surface of working contact, which consists in striking the cathode surface, with a pressure applying tool, only in directions perpendicular thereto with a rebounding stroke so that the pressure applying tool is withdrawn from the cathode surface and is out of contact therewith before lateral relative motion occurs between the striking medium and the cathode surface thereby moving all metal particles displaced during working action entirely within the cathode surface and without outside displacement.

2. In the method of mechanically working a cathode surface during the process of electrodeposition, the step of moving metal particles from one position to another entirely within the cathode surface which comprises pressing on electrodeposited surface particles of the cathode with a tool only in directions substantially normal to the surface of working contact so as to avoid lateral displacement of said surface particles to loosely superimposed positions outside of said cathode surface.

3. In the manufacture of metal articles by electrolytic deposition of metal on a continuously moving cathode surface accompanied by the application of working pressure by a tool advanced toward the cathode surface, the steps which include suspending the tool in spaced relation to the cathode surface, applying a force to the tool to move it toward the cathode surface in a direction normal thereto, checking the force before the moving tool reaches the metal on said surface and yieldingly holding the tool by a force greater than said first mentioned force when said tool is in contact with said cathode surface tending to move the tool away from the surface so that its momentum carries it into contact with the deposited metal and so that it rebounds therefrom in a normal direction before any relative lateral movement occurs between the tool and the metal in contact therewith, so that frictional sliding between the tool and the metal is avoided.

4. The method of working electrolytically deposited metal by intermittently applying pressure to the metal as it is deposited on a laterally moving cathode, which consists in maintaining an exclusively perpendicular relationship between the pressure and the metal and inhibiting the creation of pressure components in directions deviating from the perpendicular, by striking the deposited metal with a tool in a perpendicular direction with a rebounding stroke to withdraw the pressure applying tool so that it is out of contact with the metal before the metal moves laterally relatively thereto, thereby internally displacing the metal without externally abrading the surface thereof.

5. That improvement in methods of making metal articles by electrolytic deposition on a continuously moving cathode which comprises the steps of suspending an impact rod in spaced relation to a cathode surface and out of contact therewith, applying a force to the rod to move it toward the cathode surface in direction normal thereto, checking the force before the rod reaches the deposited metal, yieldingly holding the rod so that its inertia carries it into contact with the deposited metal and so that it rebounds therefrom in a normal direction with a whip action, and simultaneously subjecting the cathode surface to a vibratory movement, so that a short period of contact of the impact rod with the cathode surface is obtained.

6. Apparatus for making tubing by galvanoplastic process comprising a carriage having a plurality of cathode rods mounted for rotatable movement thereon, said rods being of substantially uniform diameter throughout their length and having an insulating surfacing material at the end adjacent the carriage, means for impacting the deposited metal during the process of electrodeposition, a working tank having journals for supporting the cathode rods therein and having rotatably mounted elastic seals at the end walls of the tank in engagement with the cathodes for sealing the electrolytic solution in the tank, means for subjecting said cathodes to rotary movement, and means for subjecting the carriage to movement coaxially with said cathodes, means for subjecting the carriage and cathode members to a rapid reverse movement, and means at the end of the working tank opposite the carriage for grippingly engaging the deposited tubing and holding it against movement when the carriage and cathode members are reversed.

7. In apparatus for making seamless tubing by galvanoplastic process, a storage tank for the electrolytic solution, a working tank mounted adjacent the solution tank, a cathode in the shape of a relatively long cylindrical rod journalled for rotation in the working tank, perforated walls in the working tank constituting supports for anode material arranged to space said material equidistant from said cathode, means for connecting the anode material inside the tank with a source of current, impact mechanism comprising a carriage having a plurality of supports movable above the working tank, a plurality of reciprocating elements mounted for sliding movement in said supports in alignment with the cathode means for maintaining said reciprocating elements out of contact with said cathode when inoperative, means for subjecting said elements to rapid reciprocatory movement to effect momentary impact contact with the deposited material on said cathode and means for slowly moving said carriage axially of said cathode in one direction and for rapidly returning said carriage to its initial starting position when it has reached the limit of its travel.

8. Apparatus for making seamless tubing by galvanoplastic process comprising a working tank for an electrolytic solution, a cathode member mounted for axial and rotary movement therein, a carriage movable relative to said tank, a plurality of impact members supported on said carriage in alignment with said cathode members, anode material substantially equally spaced from the cathode member, means for circulating the electrolytic solution in said tank, means for moving the carriage to cause the impact members to traverse the cathode in an axial direction while subjecting the surface thereof to rapid impact blows, means for regulating the speed of the impact members, and means for rapidly returning the carriage to the initial point of contact of the impact members with the cathode to thereby subject the deposited metal to substantially uniform impact contact.

9. Apparatus for making seamless tubing by galvanoplastic process comprising a storage tank for circulating an electrolytic solution, a cathodic mandrel journalled for rotation in the tank while submerged in the solution, impact mechanism for working the metal while being deposited on said mandrel comprising a movable carriage having a plurality of impact members mounted therein with their line of movement radial to the center of the mandrel, means for slowly moving the carriage in one direction and means for effecting a rapid return of the carriage in the opposite direction, means for actuating the impact members to subject them to a vibratory movement, and means for regulating the relative duration of contact of the impact members in relation to the rate of movement of the cathode surface to thereby avoid lateral distortion of the crystal structure of the metal deposited thereon.

10. In apparatus for making tubing by electrolytic process, a solution tank having a cathode extending through a pair of opposite walls thereof, a carriage outside of the tank for rotatably mounting said cathode, means on said carriage for rotating said cathode and means for slowly moving said carriage to feed the cathode in an axial direction through the solution in said tank and for rapidly returning said cathode to its starting position at the end of its feeding stroke, said cathode having rubber disks yieldingly mounted thereon for abutting spaced collars mounted in the tank walls to prevent leakage of the solution from the tank.

11. In apparatus for making tubing by electrolytic process, a solution tank having a cathode extending through a pair of opposite walls thereof, a carriage outside of the tank for rotatably mounting said cathode, means on said carriage for rotating said cathode, and means for slowly moving said carriage to feed the cathode in an axial direction through the solution in said tank and for rapidly returning said cathode to its starting position at the end of its feeding stroke, said cathode being journalled in a wall of said tank by a rubber disk which grippingly engages the cathode and a tubular housing secured in the tank wall constituting a bearing for said disk in its rotational and axial movement with said cathode.

12. Apparatus for making tubing by galvanoplastic process comprising a tank for an electrolytic solution, anode material in said tank, a cylindrical cathode rod passing through the walls of said tank, means located outside the tank for subjecting said rod to rotary and axial movement through the walls of the tank, sealing means for preventing the escape of solution from the tank, impact mechanism for loosening the deposited metal spaced from the entrance wall of the tank to permit the initial deposit to grow sufficient to endure the loosening process, said cathode having an insulated end part beyond the point of impact to prevent adhesion of the deposit on any part of the cathode to permit removal of the tubing therefrom, means for holding the tubing against axial motion and withdrawing the cathode therefrom, and means for returning the unfinished end of the tubing to adjacent the entrance wall of the tank.

13. In apparatus for making metal articles by galvanoplastic process, a solution tank, a working tank, a cathode extending through opposite walls of the working tank, a carriage for mounting said cathode for rotary movement, means for subjecting said carriage to movement to and from said working tank, impact mechanism mounted above said working tank, reciprocating members for impacting the deposited metal on said cathode, means for slowly moving the impact element in one direction to progressively work the cathode surface with the impacting member, and means for rapidly returning the impact element to its initial working position to repeat the cycle.

14. In apparatus for making seamless tubing by galvanoplastic process, an electrolytic tank having a cathode mandrel extending through both end walls thereof, said cathode mandrel being mounted for axial and rotary motion, a carriage mounted transversely over said tank and cathode mandrel for carrying a plurality of impact elements in alignment with the center of the cathode mandrel, said impact elements being adjusted relative to the cathode surface, means for supporting said carriage adjacent both side walls of the tank, means for actuating the impact elements, means for reciprocating said carriage and impact elements a short distance and means for moving said cathode axially past every impact element to compensate for increased wall thickness of the tubing.

15. Apparatus for making tubing by electrolytic deposition, comprising a tank for an electrolytic solution having an anode therein, a cylindrical cathode journaled for rotation in said solution, one end of the cathode being secured to a movable carriage, means for subjecting the carriage to movement at a relatively low speed in the direction to feed the cathode into and through the electrolytic solution, means for reversing the carriage periodically at a rapid rate to return the cathode, means for loosening the deposited metal from the cathode surface, and means for holding the deposited metal against movement while the cathode is withdrawn therefrom.

16. Apparatus for making tubing by electrolytic deposition, comprising a tank for an electrolytic solution having an anode therein, a cylindrical cathode journaled for rotation in said solution, a carriage secured to one end of the cathode, a feed mechanism for moving the carriage axially of the cathode and a separate feed mechanism for reversing the movement of the carriage, motors actuating said feed mechanisms, a switch actuated by movement of the carriage for energizing the second-named feed mechanism, and means actuated by movement of the carriage for de-energizing said feed mechanism, said first-named feed mechanism being constantly operative and the second-named feed mechanism being intermittently operative.

17. Apparatus for making tubing by electrolytic deposition comprising a tank for an electrolytic solution having an anode therein, a cylindrical cathode journaled for rotation in said solution, a plurality of impact rods in radial alignment with the cathode, including actuating means for subjecting the rods to rapid reciprocatory movement, means for moving the cathode in an axial direction, and means for moving the impact rods on the cathode surface in the direction opposite to the axial movement of the cathode, and independent means for reversing the axial movements of the cathode and impact members.

18. Apparatus for making tubing by galvanoplastic process which comprises a tank for an electrolytic solution and anode material, a cylindrical rod constituting a cathode extending through the walls of the tank in said electrolytic solution, means for impacting and loosening the deposited metal on the cathode, means for grippingly engaging the deposited metal, means for subjecting the cathode to axial movement in the direction of the gripping means, and means for reversing the direction of axial movement of said cathode whereby to render the gripping means operative to hold the tubing against return movement with the cathode member.

19. Apparatus for making tubing by galvanoplastic process comprising a tank for electrolytic solution, anode material in said tank, a cylindrical rod constituting a cathode passing through the walls of said tank, means for subjecting said rod to axial movement transversely of the tank, and means for subjecting the same to return movement, impact mechanism for forging the deposited metal and for loosening the same on the cathode member and gripping means for engaging the deposited metal, said gripping means being operative in response to the return movement of the cathode after the same has travelled a predetermined distance, said cathode having a portion of its length insulated corresponding to the distance of return movement of the cathode before the gripping means becomes effective to prevent adhesion of any unimpacted metal.

20. Apparatus for making seamless tubing by galvanoplastic process which comprises a tank for an electrolytic solution having anode material therein, a cylindrical rod extending through the walls of the tank in said solution constituting a cathode, means adapting said rod to rotary movement, a carriage movably mounted on said tank, reciprocating impact elements mounted on said carriage for forging the deposited metal on the cathode, means for moving said carriage relative to the cathode to vary the point of contact of the impact elements with the deposited metal, means for resiliently biasing said carriage against the carriage moving means, and means for periodically releasing said carriage moving means.

21. In apparatus for making tubing by electrolytic process, a solution tank having a cathode extending through a pair of opposite walls thereof, a carriage outside of the tank for rotatably mounting said cathode, means on said carriage for rotating said cathode and means for slowly moving said carriage to feed the cathode in an axial direction through the solution in said tank and for rapidly returning said cathode to its starting position at the end of its feeding stroke.

22. The method of forming metal articles by electrodeposition which comprises the steps of electrodepositing metal to build up the desired thickness by metal accretion to present continuously changing exposed cathodic surfaces, and working the metal during such accretion by repeatedly pressing only substantially perpendicularly against the exposed cathodic surfaces with a tool to displace metal particles relative thereto entirely within the currently exposed cathodic surface while inhibiting any lateral displacement of metal particles to loosely superimposed positions on said exposed cathodic surface.

23. The method of forming metal articles by electrodeposition which comprises the steps of electrodepositing metal on a continuously moving cathode to build up the desired thickness by metal accretion to present continuously changing exposed cathodic surfaces, and repeatedly applying working pressure to the metal only by advancing a tool against the exposed cathodic surfaces with all parts of the contacting face of the tool advancing in a direction perpendicular to the cathodic surface while simultaneously restraining lateral movement of the contacting face relative to the cathodic surface while in contact therewith, and removing the contacting face before the cathodic surface moves laterally relative to said contacting face so that the total resultant working pressure thus applied by the tool face is perpendicular to the cathodic surface.

24. The method of forming metal articles by electrodeposition which comprises the steps of continuously rotating a cathodic mandrel, electrodepositing metal on the rotating mandrel to build up the desired thickness by metal accretion presenting continuously changing exposed cathodic surfaces which constantly advance due to rotation of the mandrel, traversing the mandrel with a plurality of pressing tools in a direction of traverse different from the direction of advance of the cathodic surfaces and working the metal during such accretion by repeatedly pressing the tools against the exposed cathodic surfaces only in a direction substantially perpendicular to the exposed moving cathode surface so as to avoid lateral displacement of said surface particles to loosely superimposed positions outside of said cathode surface.

25. The method of forming metal articles by electrodeposition, which comprises the steps of electrodepositing metal to form a surface of deposited metal which is irregular in that it presents alternate minute high and low portions, traversing the surface with a plurality of pressing tools moving laterally above the cathode surface, reducing said high and low portions to a common level substantially devoid of surface irregularities by pressing the tools substantially perpendicularly against the surface while holding the tool and the surface relatively stationary laterally while in contact to displace the high portions entirely within the surface by cold flow while inhibiting any lateral displacement of metal particles to loosely superimposed positions on the cathode surface.

26. The method of forming metal articles by electrodeposition on a totally submerged cathode surface which comprises the steps of electrodepositing metal to build up the desired thickness by metal accretion to present continuously changing exposed cathodic surfaces, and working the metal during such accretion by repeatedly pressing a tool substantially perpendicularly against the growing cathodic surfaces while submerged to displace metal particles relative thereto entirely within the cathodic surface while inhibiting any lateral displacement of metal particles to loosely superimposed positions on said cathodic surface.

27. In the method of working electrolytic metal during the process of electrodeposition with a tool moving laterally relative to the cathode surface, the step of pressing on the cathode surface only in perpendicular directions by alternating the application of working pressure with the lateral relative advance of the tool.

28. The method of working metal during the electrodeposition on a cathode surface with a tool moving laterally relative to the cathode surface, the step which comprises applying pressing forces to the cathode surface only in directions substantially perpendicular thereto and at the same time substantially inhibiting the creation of lateral pressure components so that overlapping of metal is avoided.

29. In the process of manufacturing metal articles by electrodeposition of metal on a continuously moving cathode surface accompanied by the application of working pressure by a tool advanced toward the cathode surface, the steps which include applying a force to the tool to move it toward the cathode surface in a direction normal thereto, interrupting said force before the tool reaches the surface, thereafter yieldingly holding the tool by a second force while it continues its advance, in part at least by momentum, until it contacts the surface, the said second force increasing as the tool approaches the surface to a maximum upon contact of the tool with the surface so that the speed of the tool decelerates during such approach and so that the tool is retracted from the cathode surface immediately upon contact therewith.

30. In impact mechanism for displacing metal particles during the process of electrodeposition, the combination of a cathode consisting of electrodeposited metal, a tool having a face for pressing on the surface particles of the cathode, means for moving the tool to bring its face intermittently into pressing engagement with the surface particles of the cathode and alternately to retract it out of engagement therewith, an intermittent drive, synchronized with said tool moving means for advancing the cathode surface laterally relative to said tool, and alternately holding the cathode surface stationary, the cathode drive and the tool moving means being timed to assure that the tool is out of contact with the cathode when the cathode is in lateral motion.

GUNNAR ROSENQVIST.

REFERENCES CITED

The following references are of record in the file of this patent:

UNITED STATES PATENTS

| Number | Name | Date |
|---|---|---|
| 2,061,554 | Billiter | Nov. 24, 1936 |
| 2,164,380 | Boyd | July 4, 1939 |
| 2,199,602 | Wright | May 7, 1940 |
| 2,203,253 | Brown | June 4, 1940 |
| 2,405,776 | Brolinson | Aug. 13, 1946 |

FOREIGN PATENTS

| Number | Country | Date |
|---|---|---|
| 11,778 | Great Britain | of 1888 |
| 18,516 | Great Britain | of 1892 |
| 23,931 | Switzerland | May 31, 1901 |

OTHER REFERENCES

"The Metal Industry," vol. 28, No. 8, August 1930, pages 378 to 380.